United States Patent [19]

Blinn et al.

[11] Patent Number: 5,999,914
[45] Date of Patent: Dec. 7, 1999

[54] ELECTRONIC PROMOTION SYSTEM FOR AN ELECTRONIC MERCHANT SYSTEM

[75] Inventors: Arnold Blinn, Bellevue, Wash.; Michael Ari Cohen, San Francisco, Calif.; Michael Lorton; Gregory J. Stein, both of Redmond, Wash.

[73] Assignee: Microsoft Corporation, Redmond, Wash.

[21] Appl. No.: 08/732,195

[22] Filed: Oct. 16, 1996

[51] Int. Cl.⁶ .................................................. G06F 19/00
[52] U.S. Cl. ................................. 705/26; 705/14; 705/27
[58] Field of Search ................................ 705/14, 23, 26, 705/27

[56] References Cited

U.S. PATENT DOCUMENTS

| | | | |
|---|---|---|---|
| 4,799,156 | 1/1989 | Shavit et al. ............................ | 364/401 |
| 4,825,045 | 4/1989 | Humble .................................. | 235/383 |
| 5,053,957 | 10/1991 | Suzuki .................................... | 364/405 |
| 5,347,632 | 9/1994 | Filepp et al. ............................ | 395/200 |
| 5,537,314 | 7/1996 | Kanter .................................... | 364/406 |
| 5,710,887 | 1/1998 | Chelliah et al. ......................... | 705/26 |
| 5,734,838 | 3/1998 | Robinson et al. ....................... | 395/214 |

OTHER PUBLICATIONS eShop Technology Merchant Manual, Feb. 21, 1996.
eShop Technology overview, Internet (http://www.eshop.com/corp/technology.html), Jan. 1, 1996.
eShop In The News—Recent Press Release. Internet address: http://www.eshop.com/corp/technology.html, May 1996.
eShop Technology overview, Internet address: http://www.e-shop.com/corp/technology.html. This reference was copied from the Internet and printed in or about May 1996; the pages are dated Jan. 1, 1996.
eShop™ Technology Merchant Manual, Feb. 21, 1996. This document contains proprietary material subject to M.P.E.P. § 724.

Primary Examiner—Allen R. MacDonald
Assistant Examiner—Penny Caudle
Attorney, Agent, or Firm—Lee & Hayes, PLLC

[57] ABSTRACT

An electronic promotion system apparatus and method provide promotions across a computer network. The promotion system includes a shopper browser communicating with a merchant server. A shopper places an order using the shopper browser. The order is received by the merchant server. A purchasing pipeline executing in the merchant server processes the order. The purchasing pipeline includes a promotion component. The promotion component determines the eligibility of the shopper for each one of multiple promotions using information stored in a promotion table. Furthermore, the eligibility of each item on the shopper order to trigger each one of the multiple promotions is determined. Additionally, the eligibility of each item on the shopper order to receive an award is determined. The awards are then applied appropriately. Each item may be used to trigger only one promotion where awards were granted. Furthermore, each item may only receive one award. Thus, a merchant may offer multiple promotions while ensuring the promotions are applied as intended.

19 Claims, 25 Drawing Sheets

| | SKU | NAME | DESCRIPTION | DEPT. ID. | MANUFACTURER | DATE INTRO | LIST PRICE | SALE PRICE | SALE START | COLOR VALUE | SALE END | IMAGE FILE NAME |
|---|---|---|---|---|---|---|---|---|---|---|---|---|
| 1st PRODUCT FAMILY | | | | | | | | | | | | ⋮ |
| 2nd PRODUCT FAMILY | | | | | | | | | | | | ⋮ |
| 3rd PRODUCT FAMILY | | | | | | | | | | | | ⋮ |
| 4th PRODUCT FAMILY | | | | | | | | | | | | ⋮ |
| ... | ... | ... | ... | ... | ... | ... | ... | ... | ... | ... | ... | ... |

FIG. 13

| | PRODUCT FAMILY IDENTIFIER | PRODUCT FAMILY NAME | PRODUCT FAMILY DESCRIPTION | DEPARTMENT IDENTIFIER | SIZE TYPE | DATE INTRODUCED | LIST PRICE | SALE PRICE | SALE START | SALE END | IMAGE FILE NAME | ... |
|---|---|---|---|---|---|---|---|---|---|---|---|---|
| 1st PRODUCT FAMILY | | | | | | | | | | | | |
| 2nd PRODUCT FAMILY | | | | | | | | | | | | |
| ... | ... | ... | ... | ... | ... | ... | ... | ... | ... | ... | ... | ... |

| | PRODUCT FAMILY IDENTIFIER | SKU | COLOR VALUE | SIZE VALUE | ... |
|---|---|---|---|---|---|
| 1st PRODUCT VARIANT | | | | | |
| 2nd PRODUCT VARIANT | | | | | |
| ... | ... | ... | ... | ... | ... |

| SHOPPER IDENTIFIER | DATE CREATED | IS MEMBER | NAME | ADDRESS | CITY | STATE | ZIP | COUNTRY | ... |
|---|---|---|---|---|---|---|---|---|---|
| 1st SHOPPER | | | | | | | | | |
| 2nd SHOPPER | | | | | | | | | |
| 3rd SHOPPER | | | | | | | | | |
| 4th SHOPPER | | | | | | | | | |
| ... | ... | ... | ... | ... | ... | ... | ... | ... | ... |

| | PROMO ID | PROMO NAME | PROMO DESCRIPTION | PROMO RANK | ACTIVE | DATE START | DATE END | SHOPPER ALL | SHOPPER COLUMN | ... |
|---|---|---|---|---|---|---|---|---|---|---|
| 1st PROMOTION | | | | | | | | | | |
| 2nd PROMOTION | | | | | | | | | | |
| 3rd PROMOTION | | | | | | | | | | |
| 4th PROMOTION | | | | | | | | | | |
| ... | ... | ... | ... | ... | ... | ... | ... | ... | ... | ... |

ORDER 1700

ORDER BLACKBOARD 1710

| KEY | VALUE |
|---|---|
| order.order_id | 100 |
| order.shopper_id | 1000 |
| order.messages | USA |
| order.is_member | 1 |
| order.name | John Doe |
| order.address | 2001 Main St. |
| ... | ... |

ITEM BLACKBOARD (HATS) 1720

| KEY | VALUE |
|---|---|
| item.sku | 1234 |
| item.name | hats |
| item.decription | Men's hats |
| item.dept_id | 55555 |
| manufacturer | acme |
| item.dateintro | 1-1-1999 |
| item.list_price | $11 |
| item.sale_price | $9 |
| item.sale_start | 10-1-1999 |
| item.sale_end | 3-1-2000 |
| size_value | 8 |
| item.image_file_name | hatimage |
| color_value | red |
| item.current_price | 7 |
| item.n_unadjusted | |
| item.adjusted_price | $0 |
| item.quantity | 7 |
| ... | ... |

ITEM BLACKBOARD (red gloves) 1730

| KEY | VALUE |
|---|---|
| item.sku | 5678 |
| item.name | gloves |
| item.decription | men's gloves |
| item.dept_id | 11111 |
| manufacturer | acme |
| item.dateintro | 11-1-1999 |
| item.list_price | $5 |
| item.sale_price | |
| item.sale_start | |
| item.sale_end | |
| size_value | large |
| item.image_file_name | redgloveimage |
| color_value | red |
| item.current_price | |
| item.n_unadjusted | 2 |
| item.adjusted_price | $0 |
| item.quantity | 2 |
| ... | ... |

ITEM BLACKBOARD (blue gloves) 1740

| KEY | VALUE |
|---|---|
| item.sku | 5679 |
| item.name | gloves |
| item.decription | men's gloves |
| item.dept_id | 11111 |
| manufacturer | acme |
| item.dateintro | 11-1-1999 |
| item.list_price | $6 |
| item.sale_price | |
| item.sale_start | |
| item.sale_end | |
| size_value | large |
| item.image_file_name | bluegloveimage |
| color_value | blue |
| item.current_price | |
| item.n_unadjusted | 2 |
| item.adjusted_price | $0 |
| item.quantity | 2 |
| ... | ... |

FIG. 17

ELECTRONIC PROMOTION SYSTEM FOR AN ELECTRONIC MERCHANT SYSTEM

BACKGROUND OF THE INVENTION

1. Field of the Invention

This invention relates to electronic merchandising systems, which provide merchants the ability to sell products over distributed public networks such as the Internet. More particularly, this invention relates to a system for providing customizable and flexible merchandising promotions over the Internet.

2. Description of the Related Art

The demand for "on-line" interactive shopping has given rise to electronic merchandising systems which make use of the Internet and the World Wide Web ("Web"). These merchandising systems include merchant server sites and client sites. Typically, a consumer or shopper uses a personal computer as a client site. When placing an order the consumer uses a standard Web browser, such as Microsoft's Internet Explorer® browser, running on the client site to retrieve hypertext documents from the merchant server site. The hypertext documents typically contain product offerings and order forms. The consumer enters ordering information, including the items he wishes to order, the form of payment, and the shipping information, onto the order form.

To fully exploit the potential of "on-line" shopping, merchants need effective promotion tools to optimize their sales. One significant drawback of existing electronic merchandising systems is that they do not provide a flexible mechanism for offering promotions, including the sophisticated discounting of prices and the granting of awards. Typically, existing electronic merchandising systems are limited to employing electronic coupon-based promotion schemes. An electronic coupon, for example, may entitle any coupon holder to a flat percentage discount on a purchased product. Electronic coupons, however, are restrictive because they do not provide flexible pricing schemes such as varying discounts for bulk purchases. In addition, electronic coupons do not allow merchants to tailor discounts for particular customers or for groups of items. Furthermore, electronic coupons do not permit merchants to offer multiple or overlapping promotions.

Thus, merchants using current electronic merchandising systems cannot not adequately optimize sale promotions to increase profits and to efficiently service consumers.

SUMMARY OF THE INVENTION

The present invention provides promotion stages for an electronic merchant system. The promotion stages allow a merchant to offer promotions over the Internet in a very flexible manner. In the preferred embodiment, the promotions offered by a merchant can include temporary sale pricing, volume discounts, membership discounts and cross-purchasing awards.

When a merchant desires to define a promotion, a hypertext document which prompts the merchant to enter information about one or more promotions is displayed. For example, the merchant can define a "buy three, get one free" promotion. Another promotion might define that all jazz music is 30% off, etc.

After the merchant has entered the promotional information into the hypertext document, the information is stored into a promotion table. The promotion table contains multiple rows and columns. Each of the rows is a record defining a different promotion such that multiple promotions can be active simultaneously. Each column further contains merchant-defined information, including promotion rank, promotion start and stop dates, shopper eligibly information, promoted items, and so forth.

When a customer submits an order, the Merchant Server System invokes the purchasing components while processing the order. Generally, the order includes customer information such as a customer identifier and a list of the items the customer wishes to purchase. The promotion stages determine if any discounts or awards should be applied to the order based on the data in the promotion table.

In the preferred embodiment, the promotion stages determine which promotions apply by evaluating the promotion table for the highest ranked promotion. The promotion stages then determine if that promotion is active. If so, the promotion stages determine if the shopper making the purchase is eligible for the promotion. The promotion table can, for example, specify that a specific customer, a particular group of customers, or all customers are eligible for the promotion. For instance, only customers who have joined the merchant's membership club may be eligible to obtain certain promotions.

If the customer meets the eligibility requirements, the promotion stages determine whether a given product is part of the promotion. The promotion table can, for example specify that a specific product, a group of products or that all products are part of the promotion. For instance, the promotion stages can determine whether a tape for jazz music triggers the 30% discount on jazz music.

If the product triggers a promotion, the promotion stages determine if the customer has bought the required amount of products to trigger the promotion. Here, the promotion table can specify that the required amount of products is based upon unit quantity, the dollar value, etc. For example, the consumer must purchase three music tapes to obtain the buy three, get one free promotion.

Once the promotion stages have determined the above, they then calculate the discount amount on each promoted product. Preferably, the promotion stages then remove from future promotional consideration any products on the order which have received a discount. In accordance with the merchant ranking, the above process is then repeated for the next highest ranking promotion in the promotion table. Removing the discounted items from future promotional consideration, ensures that the promotion stages discount a particular product only once. In an alternative embodiment, the discounted item is considered for additional promotions.

For example, in some cases one promotion may give the consumer a free music tape when the consumer buys three music tapes. Another concurrent promotion may give 30% off on all tapes for jazz music. Assuming that the consumer purchases three music tapes and selects a jazz music tape as the free one, the merchant may not want the consumer to get an additional 30% discount for selecting a free jazz tape. Thus, if desired, the promotion stages preferably remove the three tapes and the free jazz tape from consideration before applying the jazz music promotion. Alternatively, the merchant may wish the consumer to receive both a free tape when purchasing three other tapes, and also receive the 30% discount on all jazz tapes. Thus, purchasing three jazz tapes, in this embodiment, will entitle the consumer to a free tape, as well as an additional 30% off the three jazz tapes.

Furthermore, the present invention allows promotional advertising to be selectively presented to the consumer. Thus, in a preferred embodiment, promotional advertising will be presented to the consumer only if the consumer and the consumer's order is eligible for the promotion. For example, if the promotion is directed only at store members, and entitles members who purchase a hat to purchase an umbrella at half price, then the promotional advertisement, "with the purchase of every hat, get an umbrella at half-price" will, in one embodiment, only be presented to store members placing an order for a hat.

BRIEF DESCRIPTION OF THE DRAWINGS

These and other aspects, advantages, and novel features of the invention will become apparent upon reading the following detailed description and upon reference to accompanying drawings in which:

FIG. 12A illustrates one embodiment of the promotion modification administration hypertext page;

FIG. 12B illustrates one embodiment of the promotion creation administration hypertext page;

FIG. 13A illustrates one embodiment of the product table format;

FIG. 14A illustrates one embodiment of the product family table format;

FIG. 14B illustrates one embodiment of the product variant table format;

FIG. 15 illustrates one embodiment of the shopper table format;

FIG. 16 illustrates one embodiment of the promotion table format; and

FIG. 17 illustrates a sample order in accordance with one embodiment of the present invention.

DETAILED DESCRIPTION OF THE PREFERRED EMBODIMENT

Figure 1A:
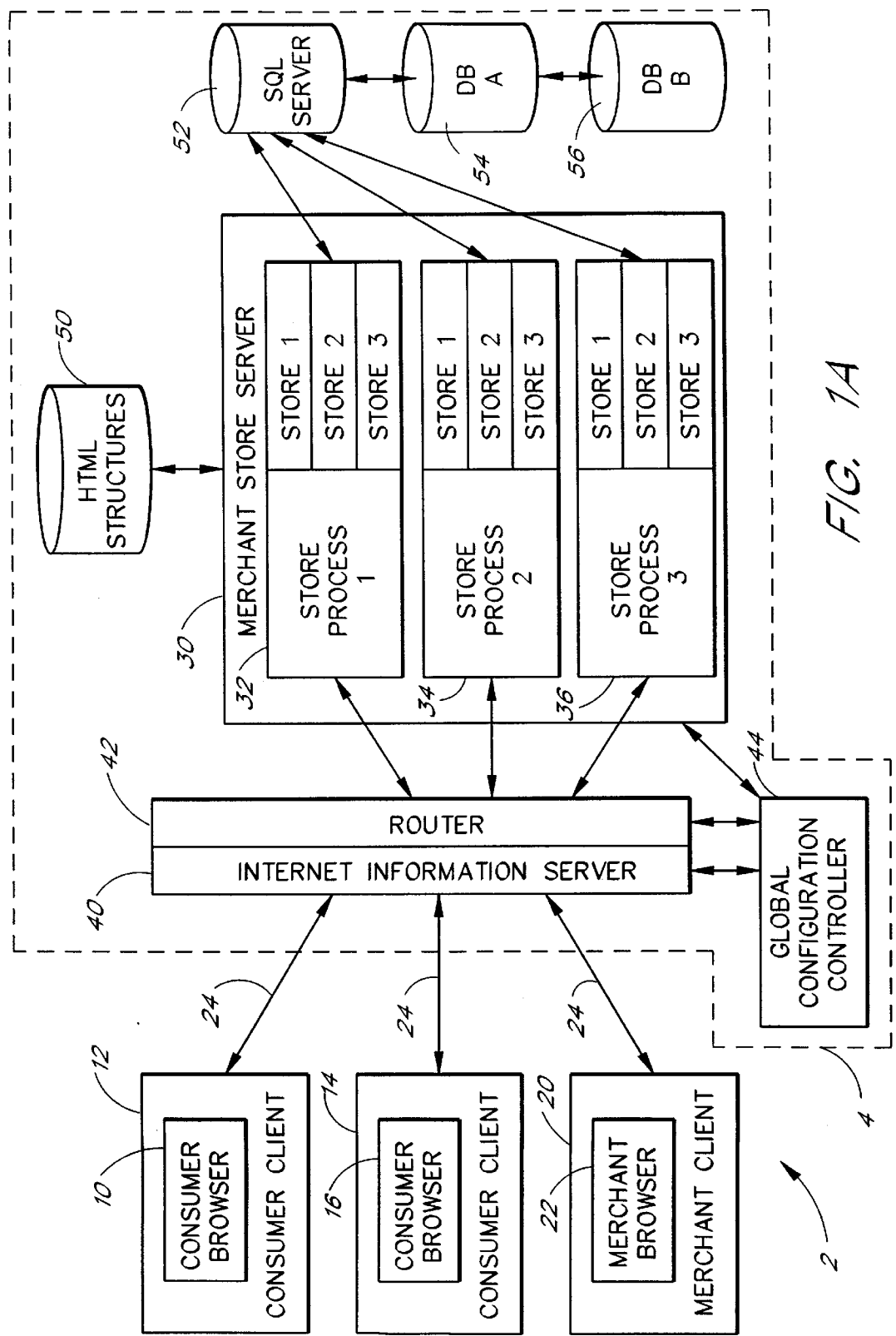
FIG. 1A is a high level block diagram illustrating the architecture of an on-line electronic merchandising system adapted to implement a preferred embodiment of the present invention.

The present invention provides a method and system for creating and applying merchandising promotions, and for offering the promotions to consumers using the World Wide Web ("Web"). A merchant can create custom promotions without having to write new code by directly entering custom promotion rules into an HTML (HyperText Markup Language) document.

The detailed description which follows is organized into the following sections: Glossary of Terms and Acronyms, Architectural Overview Of An On-Line System Appropriate For Use With The Promotion Stages, Architectural Overview Of An Ordering Process, Implementation Of The Promotion Stages, HTML Promotion Rules Form For Use in Defining The Promotions, and the Conclusion.

I. Glossary of Terms and Acronyms

To facilitate a complete understanding of the invention, the following terms and acronyms, used throughout the detailed description, are explained.

Action. An action performs various functions in the electronic merchandising system such as, by way of example, adding an item to an order form, beginning a purchase process, or inserting or deleting data from a database.

Client-Server. A model of interaction in a distributed system in which a program at one site sends a request to a program at another site and waits for a response. The requesting program is called the "client," and the program which responds to the request is called the "server." In the context of the World Wide Web, the client is a "Web browser" (or simply "browser") which runs on a computer of a user; the program which responds to browser requests by serving Web pages is commonly referred to as a "Web server."

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or "HTML document") is subsequently transferred from a Web server to a browser, the codes are interpreted by the browser and used to parse and display the document. In addition to specifying how the Web browser is to display the document, HTML tags can be used to create links to other Web documents (commonly referred to as "hyperlinks"). For more information on HTML, see Ian S. Graham, *The HTML Source Book*, John Wiley and Sons, Inc., 1995 (ISBN 0471-11894-4).

HTTP (Hypertext Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to the existing networks and standard protocols.)

ISAPI (Internet Server Application Program Interface). Microsoft's interface for allowing a Web server (or other information server) to launch and interact with external programs in response to requests from clients. ISAPI programs are in the form of dynamic link libraries (DLLs) which run in the same process space as the Web server. Thus, ISAPI performs a similar function to that of CGI, but without requiring the launching of a separate process. Documentation on ISAPI is available from Microsoft Corporation as part of the Microsoft Internet Information Server Software Development kit.

Persistent Client State Cookies (Cookie). A file stored on the client computer which contains information such as user names and preferences. In the preferred embodiment, the Cookie in the consumer computer stores a member code which uniquely identifies each consumer. The specification for Cookies can be found at http://www.netscape.com/newsref/std/ cookie_spec.html.

URL (Uniform Resource Locator). A unique address which fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

World Wide Web ("Web"). Used herein to refer generally to both (i) a distributed collection of interlinked, user-viewable hypertext documents (commonly referred to as "Web documents" or "Web pages") that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

II. Architectural Overview Of An On-Line System Appropriate For Use With The Promotion Stages This section provides an overview of the on-line electronic merchandising system. FIG. 1A is a high level block diagram illustrating the architecture of an on-line electronic merchandising system adapted to implement a preferred embodiment of the present invention. (In FIG. 1A and throughout the drawings, components which correspond to components shown in previous figures are identified using the same reference numbers.) The on-line electronic merchandising system 2 includes one or more consumer browsers 10, 14 executing on corresponding client sites 12, 16, a merchant browser 22 executing on a merchant client site 20, and a merchant system 4. In the preferred embodiment, the merchant system 4 is connected to the consumer client sites 12, 16 and the merchant client site 20 by one or more communication mediums, such as a wide area network (WAN) 24. The wide area network allows the users of the consumer client sites 12, 16, the merchant site 22, and the merchant system 4 to communicate. The wide area network 24 in the preferred embodiment is the Internet network.

Focusing now on a preferred embodiment of the consumer clients 12, 14 which, in the preferred embodiment, include the consumer browsers 10, 16, each consumer client 12, 14 operates on a general purpose computer (hereinafter referred to as the consumer computer). In the preferred embodiment, the consumer computer is a conventional personal computer which is equipped with a conventional modem. Preferably, the computer runs an appropriate operating system such as the Microsoft® Windows® 3.1, Microsoft® Windows 95, Microsoft® Windows® NT, the Apple® MacOS®, Unix, or IBM® OS/2® operating systems. As is conventional, the preferred operating system includes a TCP/IP stack which handles all incoming and outgoing message traffic passed over the communications medium 24.

In other embodiments, the consumer computer could, for example, be a computer workstation, a local area network of computers, an interactive television, an interactive kiosk, a personal digital assistant, an interactive wireless communications device or the like which can interact with the communication medium 24. While in such systems, the operating systems will differ, they will continue to provide the appropriate communications protocols needed to establish communication links with the communication medium 24.

In the preferred embodiment, the consumer browser is a software program which allows a consumer to access the merchant system over the communication medium 24. In the preferred embodiment, the consumer browser is the Microsoft® Internet Explorer version 3.0 developed by Microsoft Corporation. One of ordinary skill in the art, however, will recognize that numerous other types of access software could also be used to implement the present invention. These other types of access software could, for example, be other types of Internet browsers such as the Netscape® Navigator developed by Netscape, Inc., or other types of client applications including custom network browsers, two-way communications software, cable modem software, point-to-point software and the like.

Associated with each consumer browser 10, 16 is an optional cookie module (not shown) which stores a shopper identifier code. The shopper identification code, uniquely identifies each consumer. A "cookie" is a file which stores information on the consumer computer for use by the merchant system 4. In the preferred embodiment, the consumer browser stores the shopper identifier code in the cookie so that the consumer does not need to retype the shopper identifier code each time the consumer accesses the electronic merchandising system. The specification for cookies is defined by Netscape Corporation and can be found at http://www.netscape.com/newsref/std/cookie_spec.html.

In an alternative embodiment, a cookie does not store the shopper identification code. Rather, the shopper identifier code is obtained by the merchant system 4 from the database when the consumer accesses the merchant system. In such embodiments, when the consumer accessing the merchant system, the merchant system prompts the consumer to enter a password and other information which the merchant system then uses to obtain the shopper identification code from the database.

Focusing now on a preferred embodiment of the merchant client 20 which, in the preferred embodiment, includes the merchant browser 22, the merchant client 20, operates on a general purpose computer. The merchant browser 22 allows a merchant to interact with the merchant system 4. In some embodiments, the merchant browser 22 may execute on the same device as the merchant system 4. In other embodiments, the merchant browser executes on a separate computer which accesses the merchant system 4 via a communication medium or network 24. In the preferred embodiment, a merchant uses the merchant client 20 to configure the merchant system 4.

Preferably, the merchant browser 22 executes on a conventional personal computer (the merchant computer) which is equipped with a conventional modem. The merchant computer runs an appropriate operating system such as the Microsoft® Windows® 3.1, Microsoft® Windows 95, Microsoft® Windows® NT, the Apple® MacOS®, Unix, or IBM® OS/2® operating systems. As is conventional, the preferred operating system includes a TCP/IP stack which handles all incoming and outgoing message traffic passed over the communications medium.

In the preferred embodiment, the merchant browser 22 is a software program which allows a merchant to access the merchant system 4 over the communication medium. In the preferred embodiment, the merchant browser 22 is the Microsoft® Internet Explorer, Version 3.0 developed by Microsoft Corporation. One of ordinary skill in the art, however, will recognize that numerous other types of access software could also be used to implement the present invention. Such access software could, for example, be other types of Internet browsers such as the Netscape® Navigator developed by Netscape, Inc., and other client software such as custom network browsers, two-way communications software, cable modem software, point-to-point software and the like.

The merchant system 4 includes at least one merchant store server 30. The store server 30 includes a merchant application program executing on a computer system. The store server 30 provides merchandising services to users of the consumer client sites 12, 16. Preferably, the merchandising service is implemented as a client-server application, with the merchandising application (the merchandising service) running on the merchant store server 30, and with the client applications (the browsers) running on consumer client sites 12, 16. In the preferred embodiment, each merchant store server 30 can operate multiple electronic stores. The stores may be operated either as stand-alone stores, or as part of an electronic mall.

An information server 40 is preferably interposed between the clients 12, 16, 22 and the merchant store server 30. The information server 40 may be configured using any one of a number of commercially available software packages, including the Internet Information Server (ISS) from the Microsoft Corporation. In the preferred embodiment, the information server 40 is a World Wide Web server. The information server 40 supports the use of virtual servers, allowing multiple web servers to run on a single computer. The information server 40 uses the HyperText Transmission Protocol (HTTP) to communicate with the client browsers 10, 14 or the merchant browser 20. The information server 40 supports HTTP requests from the browsers 10, 20 for pages (normally script files) or documents from the merchant system 4.

As will be discussed in more detail below, in the preferred embodiment, a router 42 is interposed between the information server 40 and the merchant store server 30. The router routes page requests from the information server 40 to an appropriate store process 32, 34, 36 running on the merchant store server 30. The requests are processed and the result is returned to the router 42. The router 42 then sends the result back to the information server 40. The operation of the merchant store server 30 is described in greater detail below.

In the preferred embodiment, a controller 44 contains global configuration registry information defining the merchant store server 30 configuration. The registry information may include the names of all the electronic stores on the merchant store server 30, the location of database components within each store, the location of template files used by the store server and router, system error messages, system constants such as date and currency formats, and other pertinent information. The router 42 and the merchant store server 30 utilize the configuration information in the controller registry to perform their respective functions.

The components which make up the merchant system 4, including the information server 40, the router 42, the controller 44, and the merchant store server 30, may, in one preferred embodiment, all exist on one computer, or, in another preferred embodiment, they may be distributed over several computers.

The operation of the router 42 will now be described. In the preferred embodiment, the router is an Internet Server Application Programming Interface (ISAPI) filter. ISAPI is a programming interface developed by, and available from the Microsoft Corporation. The use of ISAPI filters is well known to one skilled in the art. The router 42 examines a URL address specified in the request, and determines from the URL path if the URL is a request to a store, rather than a file and directory on the merchant store server 30. If the URL request is to a store, the router 42 further parses the URL to determine the store name. The router 42 uses the URL address and information stored in the controller registry to route page requests from a browser 10, 14, 20 to one of the store processes 32, 34, 36. Once the request is processed, the store server sends the result back to the router 42. The router 42 then replies to the requesting client through the information server 40 in the form of an HTML document.

The operation of the merchant store server 30 will now be described. Upon start-up, the merchant store server 30 initiates multiple store server processes 32, 34, 36 as defined in the controller registry. The merchant store server 30 receives client requests, including the URL, from the router 40. The first available store server process 32, 34, 36 handles the request. The store server process 32, 34, 36 reads a source file defined by the URL and performs all of the dynamic page generation required to complete the request.

In the preferred embodiment, the merchant store server 30 is connected to a storage device 50 storing HTML structures, including order form pages, and administrative forms, and a Structured Query Language (SQL) server 70. The SQL server 70 in turn may be connected to one or more databases 54, 56 residing on storage devices. Preferably, the databases 54, 56 are implemented using Structured Query Language (SQL) code. The structured query language is a language standardized by the International Standards Organization (ISO) for defining, updating and querying relational databases. For example, the databases can be implemented with any number of commercial database programs including Microsoft SQL Server®, Oracle's relational database products and the like. The storage devices 50, 52 may be either local to the merchant store server 30, or may be accessible to the merchant store server 30 over one or more local area networks (LAN) or wide area networks (WAN).

In the preferred embodiment, the product data and other merchandising data is stored in a number of tables located in the databases 54, 56. The tables used to enable the preferred embodiment include, but are not limited to, a shopper table 162, a product table 164, and a promotion table 160, as illustrated in FIG. 1D. These table are described in greater detail below.

In a preferred embodiment, the merchant store server 30 is configured to run on a general purpose Pentiumg class (or better) based computer. The preferred operating system is Microsoft Windows® NT version 3.51 or later with a Windows® NT file system. The computer typically includes at least 64 megabytes of memory, at least 45 megabytes of free hard disk space, and a CD-ROM drive. In another preferred embodiment, the merchant store server 30 is configured to run on multiple Pentium® class (or better) based computers.

During a typical shopping session, the consumer client and the merchant store server 30 communicate with each other over the wide area network 24. The consumer uses the standard Web browser 10, such as Microsoft's Internet Explorer®, to access the merchant store server 30, and to retrieve HTML documents. The HTML documents may contain product offerings, promotional advertisements, and order forms. The shopper places an order, which, in one embodiment, includes the items he wishes to order, the form of payment, and shipping information. An item typically includes a product identifier, such as a stock keeping unit (sku), as well as any other specifics related to the product. For example, the item may be a shirt having a sku of "1234" and a monogram "MOC". The order is processed by the merchant system 4 and upon successful processing of the order, the order is fulfilled by the merchant.

Figure 1B:
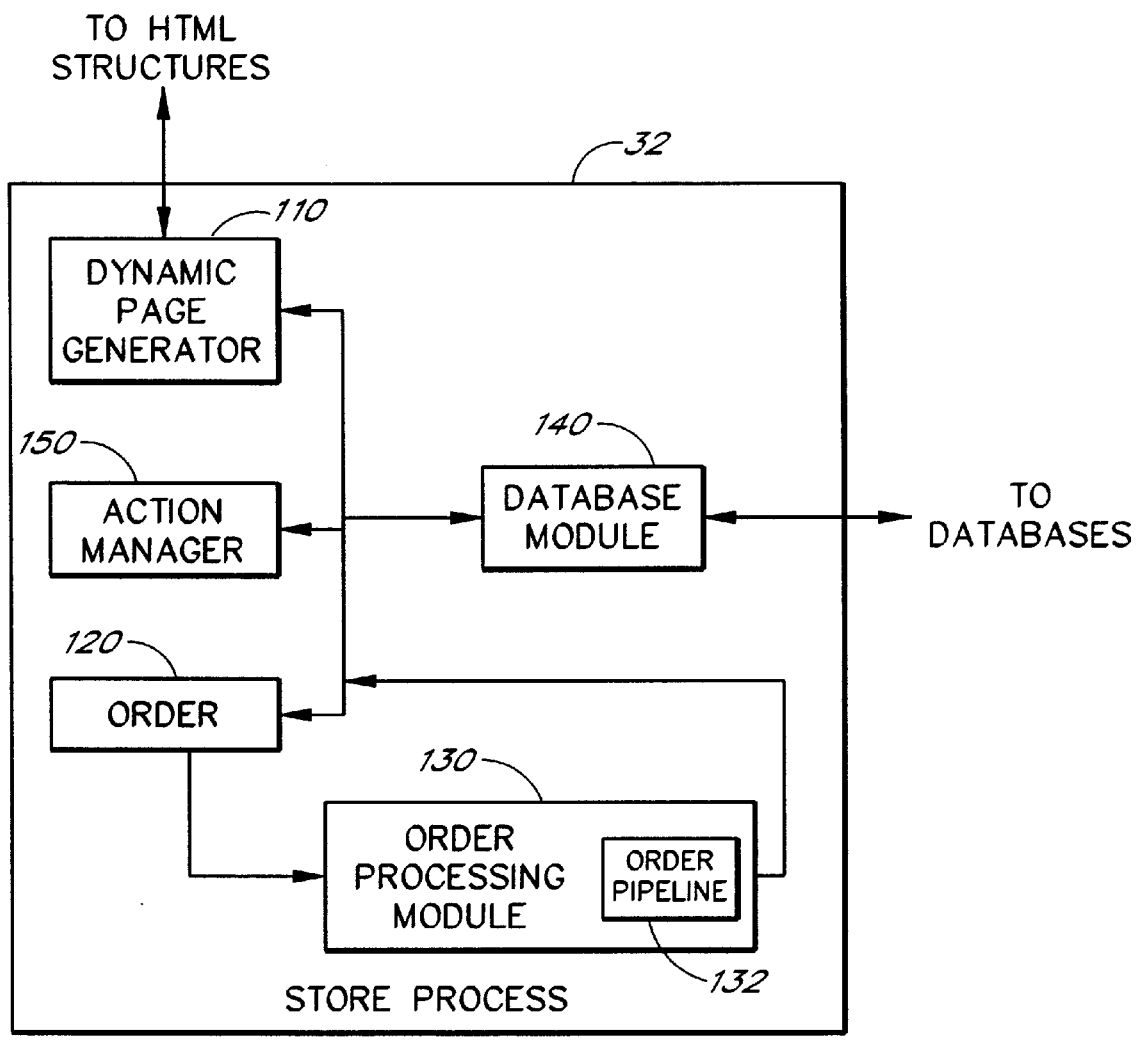
FIG. 1B is detailed block diagram illustrating one embodiment of a store process.

FIG. 1B illustrates a detailed block diagram of a preferred embodiment of a store process 32, 34, 36. Each store process 32, 34, 36 includes a dynamic page generator 110, an action manager 150, a database module 140, and an order processing module 130. The dynamic page generator 110, the action manager 150, the database module 140, and the order processing module 130 can, in the preferred embodiment, communicate with each other.

During a typical shopping session, the consumer browser and the store server process communicate with each other over the communications medium 24. Typically, the consumer browser sends URL addresses to one of the store server processes 32, 34, 36, and the store server process 32, 34, 36 responds with HTML documents. The HTML documents may contain registration information, product offerings, promotional advertisements, order forms, etc.

The page generator 110 generates the HTML documents sent to the consumer browser. The page generator 110 dynamically creates HTML documents in response to commands generated by the consumer browser. In the preferred embodiment, the commands generated by the consumer browser utilize the standard GET/POST format of the HyperText Transport Protocol (HTTP). For example, the buttons (or other content items) in an HTML page contain a URL address. When the consumer clicks the button within the consumer browser, the consumer browser generates an HTTP GET message which includes the URL address associated with the button. The HTTP GET message and the associated URL address is then sent from the consumer Web browser to the page generator 110.

The page generator 110 receives the HTTP GET message and the associated URL address, the page generator 110 identifies the template which is associated with the URL address. The page generator 110 then processes the template to generate the appropriate web page. While the page generator 110 in the preferred embodiment dynamically generates the HTML pages based on commands which exist in templates, in other embodiments, the page generator 110 may have a database of HTML pages which are sent to the consumer browser.

The store process 32, 34, 36 additionally contains the shopper order 120. Preferably, the electronic order 120 is an unstructured blackboard which comprises multiple key-value pairs.

The key-value pairs define different aspects of a sales transaction. For example, the key-value pairs define which items the consumer has selected, the number of desired items, where to ship the items, the identity of the consumer, the billing information, etc. Different components in the store server process operate on the key-value pairs to complete a sales transaction.

Figure 1C:
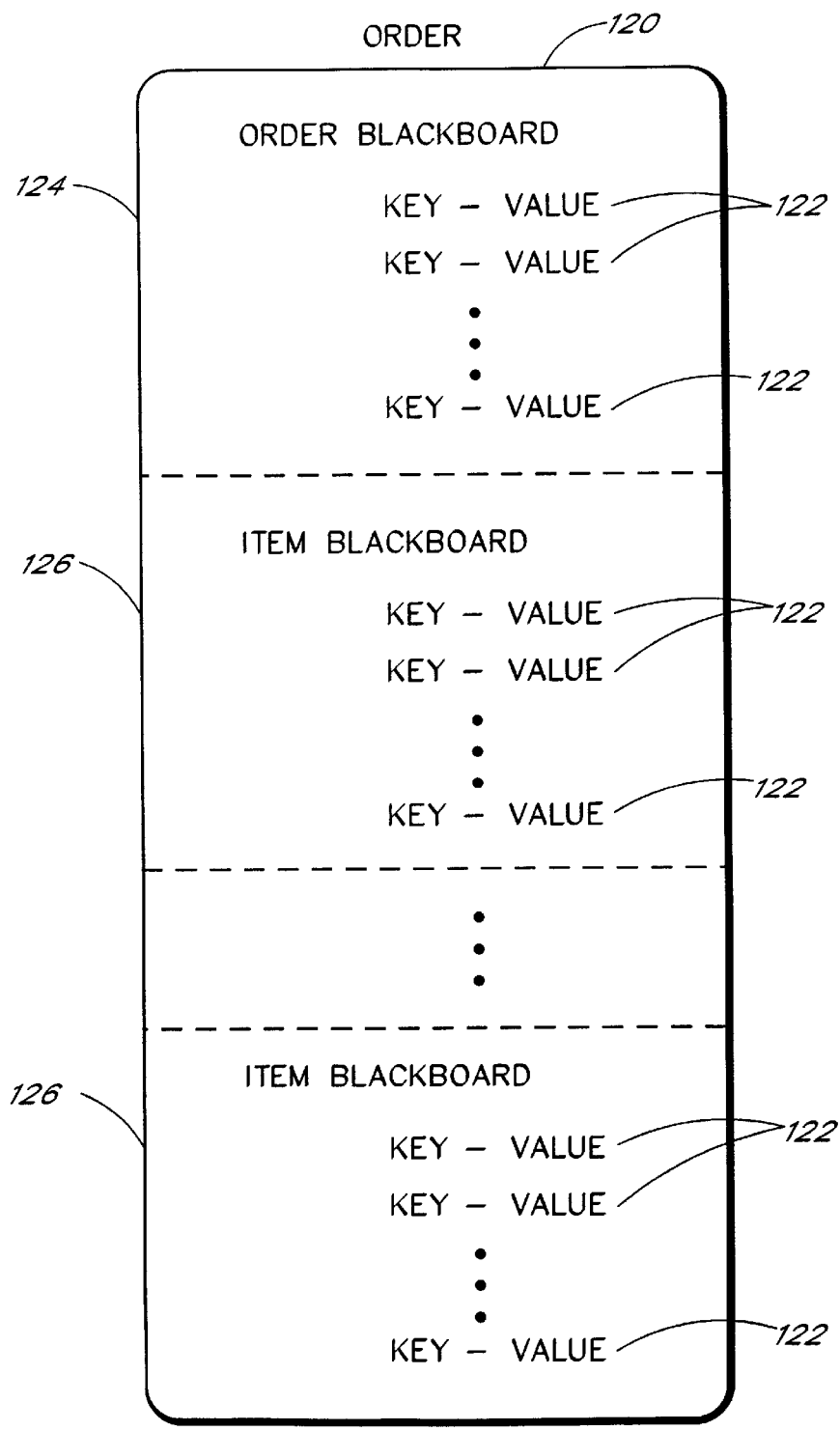
FIG. 1C illustrates the format of an order in accordance with one embodiment of the present invention.
Figure 1D:
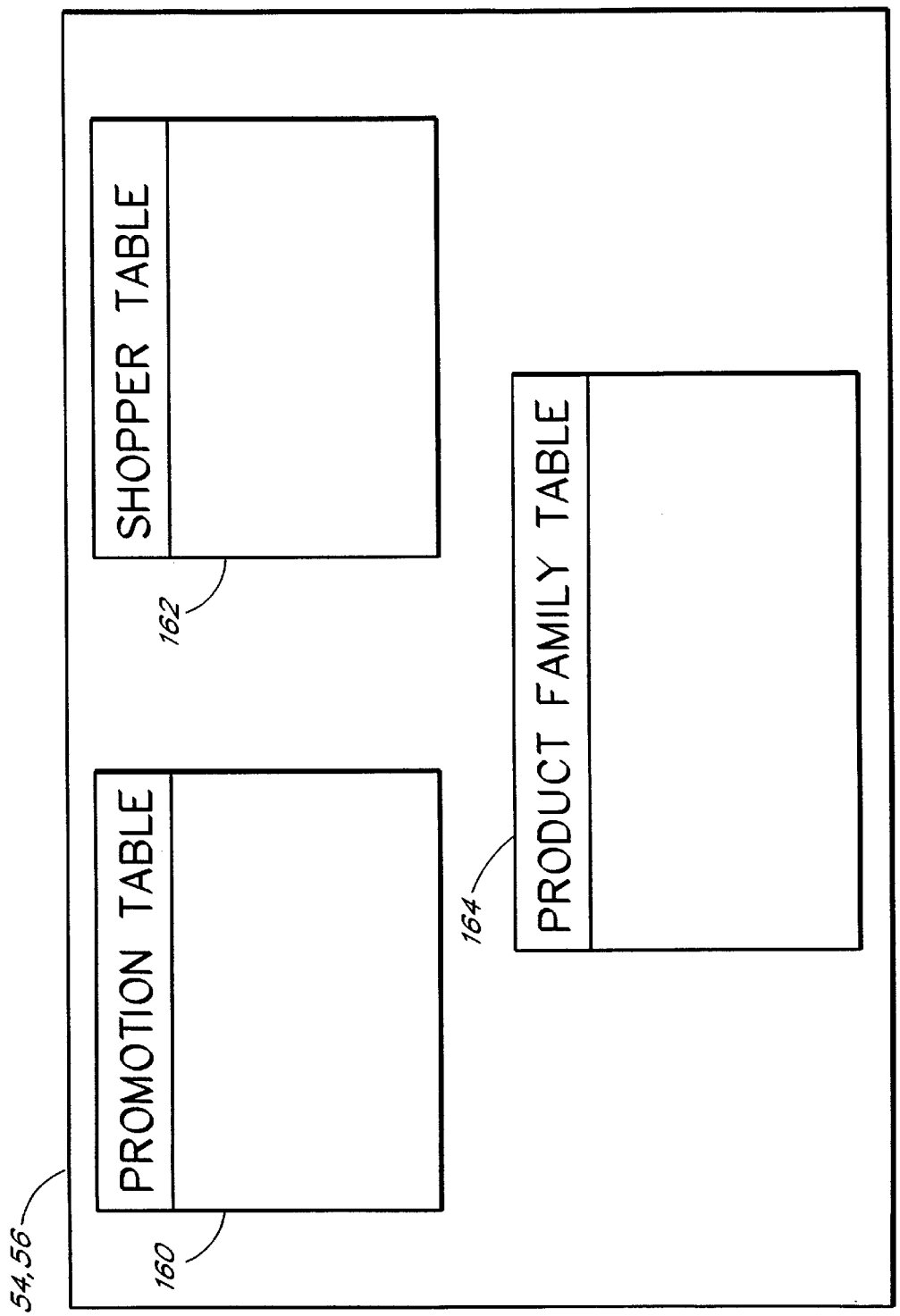
FIG. 1D illustrates the data structures stored in the databases in accordance with one embodiment of the present invention.

A detailed diagram of the order 120 is illustrated in FIG. 1C. Unlike organized database entries, the key-value pairs 122 in the blackboards 124, 126 are indexed by keys. Each key is a string which uniquely identifies its associated value. To locate a particular value, the present invention searches one of the blackboards 124 or 126 for the proper key and then accesses the value associated with the key. In the Python programming language, a blackboard is also often called a dictionary.

In the preferred embodiment, the order 120 is an object which comprises at least one order blackboard 124 and one or more item blackboards 126. Preferably, each blackboard is an associative array which contains a key and a value for each key-value pair 122. The key-value pairs 122 in the order blackboard 124 contain order properties such as the order date, the consumer's name, the consumer's address, the desired shipping address, the billing information, the order subtotal, the taxes, the order total, etc.

The preferred format of the order key-value pairs 122 is "order.key." For example, the key for the order identification code in the order blackboard 124 can be represented as "order.order_id." The "order" identifies the order blackboard 124 while the "order_id" designation identifies the order_id key-value pair.

The key-value pairs 122 in the item blackboards 126 contain item information. Preferably, an item blackboard 126 exists for each item. Furthermore, the key-value pairs 122 in one item blackboard 126 can differ from the key-value pairs 122 in another item blackboard 126. The preferred format of the item key-value pairs 122 is "item.key." For example, the key for an item's stock keeping unit (sku) can be represented as "item.sku" where "item" identifies the item blackboard 126 and the "sku" designation identifies the sku key-value pair.

When an order 120 is instantiated, a number of initial key-value pairs 122 are added to the order blackboard 124 and one or more item blackboards 126. The initial key-value pairs 122 may include, but are not limited to: an order.order_id key-value pair, an order.shopper-id key-value pair, an order.messages key-value pair, an item.sku key-value pair, an item.quantity key-value pair, an item.placed_price key-value pair, an item.adjusted_price key-value pair and an item.n_unadjusted key-value pair.

In the order blackboard 124, the order_id value in the order_id key-value pair contains the order identification code which uniquely identifies each order 120. The shopper_id value in the shopper_id key-value pair contains the shopper identification code which uniquely identifies each shopper. The messages value in the order.messages key-value pair identifies the language used for error messages. The messages value is initially set to "USA."

In each item blackboard 126, the sku value in the sku key-value pair identifies the sku which uniquely identifies a particular item. The quantity value in the quantity key-value pair identifies the number of ordered items. The placed_price value in the placed_price key-value pair identifies the price of the ordered item. The adjusted_price value in the adjusted_price key-value pair identifies the amount of the adjusted order price. The n_unadjusted value in the n_unadjusted key-value pair identifies the amount of the adjusted quantity of ordered items.

As discussed in more detail below, the components in the order processing module 130 modify some of the initial key-value pairs 122 and may add new key-value pairs 122 to the order blackboard 124 and item blackboards 126 when processing the order 120.

In the preferred embodiment, the order processing module 130 processes the order 120. The order processing module 130 contains multiple components called the order pipeline 132. Each component in the order pipeline 132 reads from or writes to its assigned key-value pairs in the order blackboard and item blackboards. Upon receiving an order form, a component searches for its assigned key-value pairs and performs the actions necessary to process the key-value pairs. For clarity, the blackboard prefix identifiers, "order" and "item," are not included as part of the key-value names in the following description.

The action manager 150 executes various functions (also called actions) in response to consumer input, while the order processing module 130 processes the electronic order forms. The order processing module 130 including the order pipeline 132, will be described in greater detail below.

The database module 140 retrieves data required by the store process from one of the databases 54, 56. In the preferred embodiment the database module 140 can retrieve data from a relational database independent of the structure or the schema of the database. The architecture of the database module is further described in a concurrently filed application having the title "Electronic Shopping and Merchandising System," Ser. No. 08/732,012, now issued as U.S. Pat. No. 5,897,622, which is incorporated herein by reference.

Figure 2:
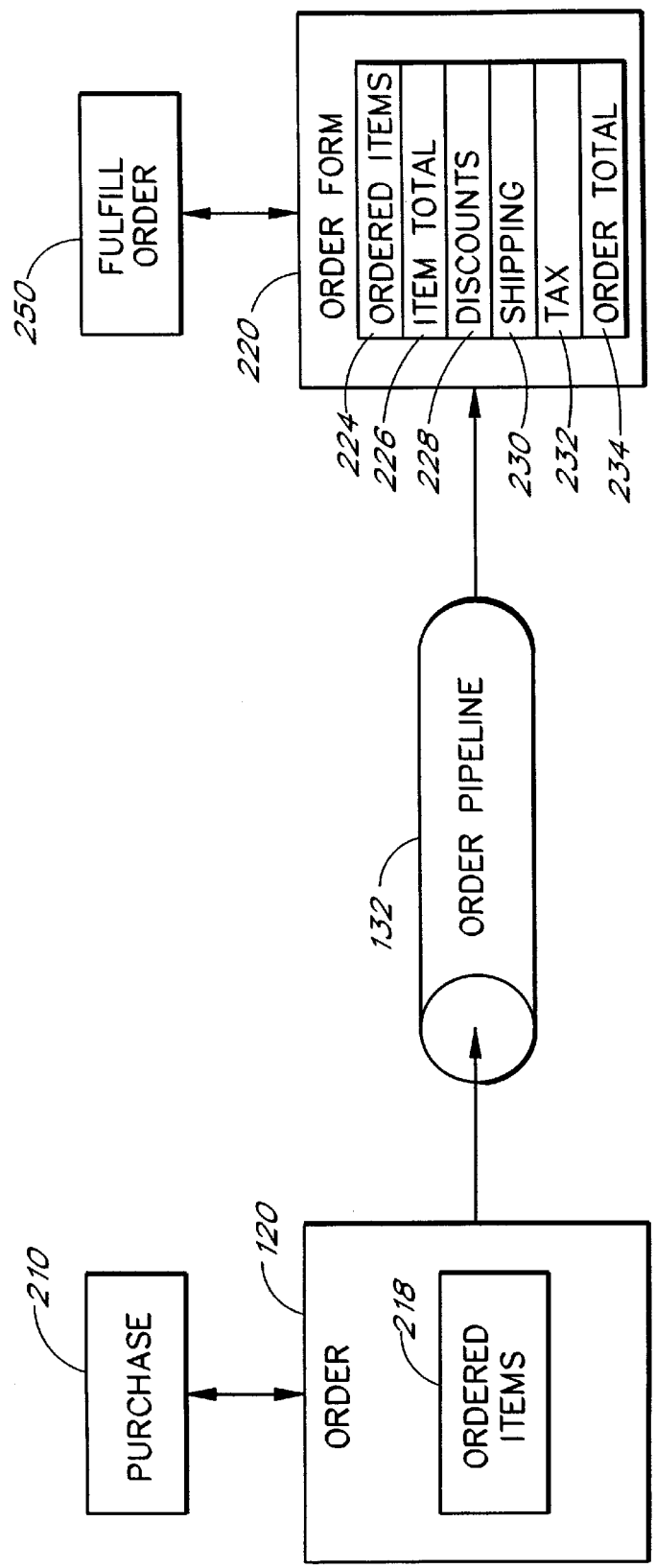
FIG. 2 is a high level block diagram illustrating an order processing process of an on-line electronic merchandising system in accordance with a one embodiment of the present invention.

FIG. 2 illustrates a preferred embodiment of the order process. When the consumer or shopper desires to make a purchase 210, he submits an electronic purchase request, including order items 218 and other shopper information. Upon receiving the shopper order 120, the merchant store server 30 invokes the order processing module 130, including the order pipeline component 132. The processing pipeline component 132, as well as sub-components or stages that make up the processing pipeline component 132, are preferably written in the Python programming language, though other programming languages may be used. As discussed in greater detail below, the order pipeline 132 reads the order 120 and determines a number of factors, including the price of the ordered items 226, any applicable discounts 228, shipping charges 230, tax 232, total cost of the order 234, as well as other factors. Once the order pipeline 132 has successfully completed processing the order 120, the shopper's order is fulfilled 250.

III. Architectural Overview Of An Ordering Process

When a shopper goes shopping in an electronic store he may view various store products by requesting the appropriate HTML pages from the merchant system 4. When the shopper wishes to purchase an item, he first "places" the item in a shopping basket by activating an appropriate button on the HTML page. If the shopper views the shopping basket and initiates the purchase processing operation by activating a checkout button, then the merchant server generates an order. The order is processed by the order pipeline 132. If the processing is completed successfully a message is passed that the order should be fulfilled.

The order format and the order processing are further described in a concurrently filed application having the title "SYSTEM AND METHOD FOR PROCESSING ELECTRONIC ORDER FORMS", Ser. No. 08/732,205 which is incorporated herein by reference.

Figure 3:
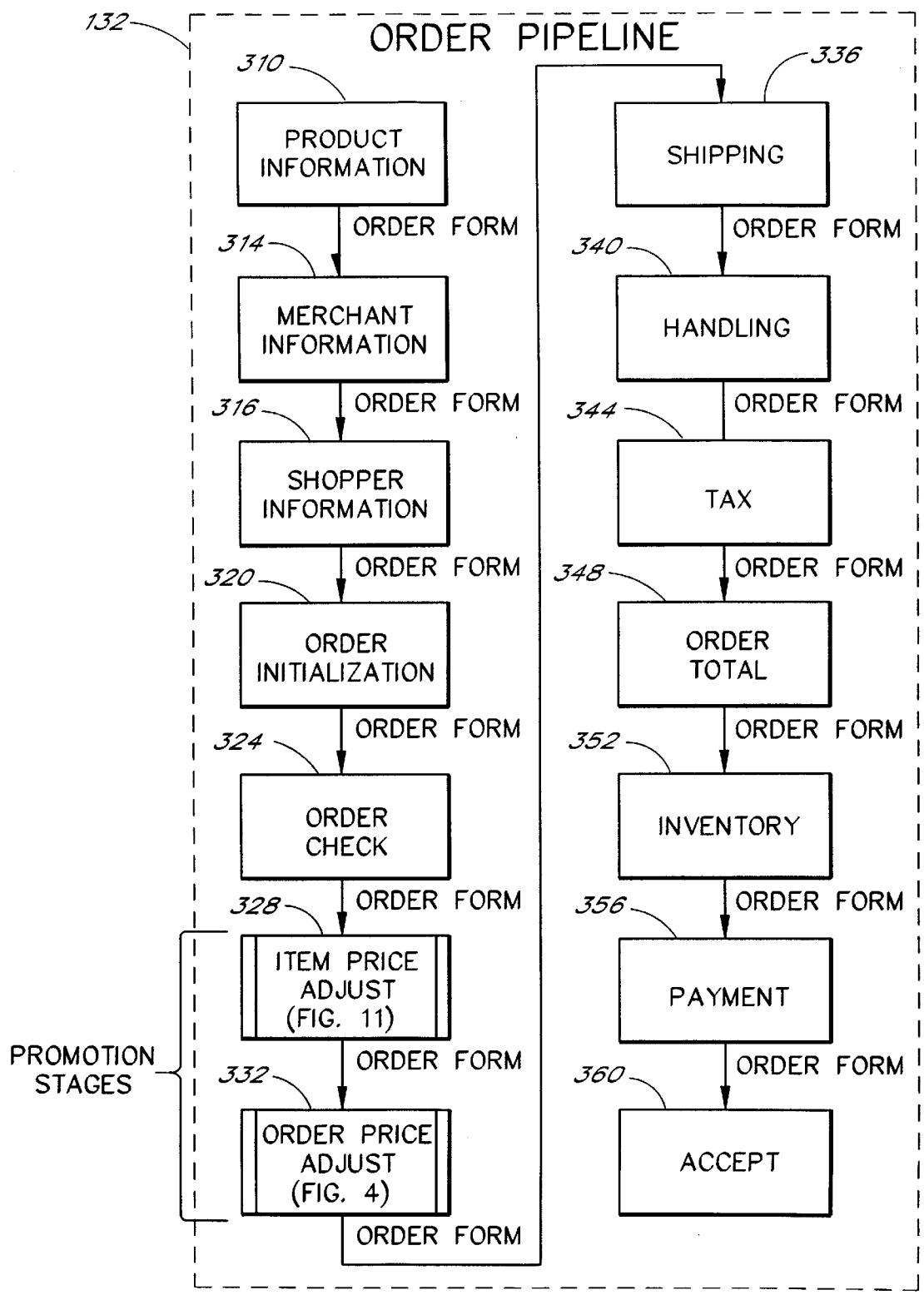
FIG. 3 illustrates a flow chart of an embodiment of the order pipeline.

The order pipeline component 132 of the preferred embodiment provides a comprehensive series of stages, including promotion stages, for processing the shopper order. A flow chart of the order pipeline 132 operation is illustrated in FIG. 3. In the preferred embodiment, the order pipeline component 132 includes fourteen stages. The stages may preferably be software components. The stages of the order pipeline component 132 are preferably instantiated before the order is processed. The instantiation of the order pipeline components or stages includes the creation of the respective stage or component and the allocation of memory to hold the respective stage or component. Component instantiation is well known in the art. Before the order 120 is processed by the order pipeline, certain key-value pairs are initialized. Thus, each item on the order has the associated value for the item.n_unadjusted set to the quantity of that item being ordered. Additionally, the value for the item.adjusted_price is set to $0. The item.n_unadjusted and item.adjusted_price key-value pairs are used by the preferred embodiment in applying promotions, as described in greater detail below. For clarity, the blackboard prefix identifiers, "order" and "item," are not included as part of the key-value names in the following description.

First, in the preferred embodiment, a product information stage 310 performs an SQL query for each item on the order 120 using the product sku, as identified in a corresponding key-value pair in the shopper order, as a key. The SQL query retrieves product information pertaining to the corresponding product from one or more product tables stored on one of the databases 54, 56 and stores the information on the order. In the preferred embodiment, only one product table is required to store product information. The product table 1300, whose format is illustrated in FIG. 13, includes multiple rows and columns. Each row in the product table is a record corresponding to a particular product, while each product table column contains information related to the product. The location of the product table is specified in the registry.

In the preferred embodiment, the information stored in the product table is defined by the storename_product schema, illustrated in Table I below.

TABLE I

PRODUCT FAMILY SCHEMA

Schema: storename_product

| Field Name | Format |
| --- | --- |
| sku | varchar(30) primary key not null |
| description | varchar(255) null |
| dept_id | int null |
| manufacturer | varchar(50) |
| date_intro | datetime null |
| list_price | int not null, |
| sale_price | int null, |
| sale_start | datetime null, |

TABLE I-continued

PRODUCT FAMILY SCHEMA

Schema: storename_product

| Field Name | Format |
|---|---|
| sale_end | datetime null, |
| color_value | varchar(20) null, |
| size_value | varchar(20) null, |
| image_file_name | varchar(255) null |

In the preferred embodiment, each product table column has a corresponding schema field associated with it. The storename_product schema fields are defined as follows: "sku" is the product's sku; "name" is the name of the product; "description" is a product description; "dept_id" is the identification code of the department which sells the product; "manufacturer" is the manufacturer of the product; "date_intro" is the product's first day of sale. This date is used by the preferred embodiment to determine if the product should be advertised to the shopper as a new product. Thus if, for example, the purchase date is less than thirty days after the "date_intro" entry, the merchant can have a starburst image with the word "NEW" appearing on the product page; "list_price" is the product's list price; "sale_price" is the product's sale price; "sale_start" is the date the sale price goes into effect; "sale_end" is the date the sale price is terminated and the list price goes back into effect; "color_value" is the product's color; "size_value" is the product's size; "image_file_name" is the file name of the product image file. Each field is associated with a corresponding column in the product family table. This file is used in generating the product page to illustrate the product. The numbers within parenthesis in Table I, as well as in the tables below, indicate the maximum permissible field length of an entry in the preferred embodiment.

In another preferred embodiment, two product tables, a product family table and a product variant table, are used to store product information. The product family table 1400 and the product variant table 1410, whose formats are respectively illustrated in FIGS. 14A and 14B, include multiple rows and columns. The preferred product family table stores information about a product family, while the product variant table stores information for a specific product within the product family. Each row in the product family table is a record corresponding to a particular product family, while each product family table column contains information related to the product families. Similarly, each row in the product variant table is a record corresponding to a particular product, while each product variant table column contains information related to the products. Thus, by way of example, a product family table row and associated columns may specify information relating to a shirt line family of products, such as sales information. In contrast, the product variant table row and associated columns may identify a specific shirt model, as well characteristics of the shirt model, such as shirt color or shirt size. The location of the product tables is specified in the registry.

In the preferred embodiment, the information stored in the product family table is defined by the storename_product_family schema, illustrated in Table II-A below. Similarly, in the preferred embodiment, the information stored in the product variant table is defined by the storename_product_variant schema, illustrated in Table II-B below.

TABLE II-A

PRODUCT FAMILY SCHEMA

Schema: storename_product_family

| Field Name | Format |
|---|---|
| pf_id | varchar(30) primary key not null |
| pf_name | varchar(255) null |
| pf_description | varchar(255) null |
| dept_id | int null |
| size_type | varchar(20) null |
| date_intro | datetime null |
| list_price | int not null |
| sale_price | int null |
| sale_start | datetime null |
| sale_end | datetime null |
| image_file_name | varchar(255) null |

In the preferred embodiment, each product family table column has a corresponding schema field associated with it. The storename_product_family schema fields are defined as follows: "pf_id" is the product family identification code; "pf_name" is the name of the product; "pf_description" is a product description; "dept_id" is the identification code of the department which sells the product; "size_type" is the product's size type for which there is a corresponding default entry in a shopper table, as will be described in greater detail below. For example, if the product is a shoe, the size_type will be "shoe" and there will be a corresponding "size_shoe" entry in the shopper table specifying the shopper's shoe size. Therefore, if the shopper orders a shoe, the preferred embodiment will select the shopper's shoe size specified in the shopper table to complete the ordering information. Similarly, the "size_type" may specify "shirt" for a shirt order, or "waist" for an order for slacks; "date_intro" is the product's first day of sale; "list_price" is the product's list price; "sale_price" is the product's sale price; "sale_start" is the date the sale price goes into effect; "sale_end" is the date the sale price is terminated and the list price goes back into effect; "image_file_name" is the file name of the product image file. Each field is associated with a corresponding column in the product family table.

TABLE II-B

PRODUCT VARIANT SCHEMA

Schema: storename_product_variant

| Field Name | Format |
|---|---|
| pf_id | varchar(30) not null |
| sku | varchar(30) primary key not null |
| color_value | varchar(20) null |
| size_value | varchar(20) null |

In the preferred embodiment, each product variant table column has a corresponding schema field associated with it. The storename_product_variant schema fields are defined as follows: "pf_id" is the product family identification code; "sku" is the product's sku; "color_value" is the product's color; "size_value" is the product's size. In the preferred embodiment, a product within a product family will have the same value in the pf_id column in the product variant table as the corresponding pf_id field column entry in the associated product family row in the product family table.

Figure 4:
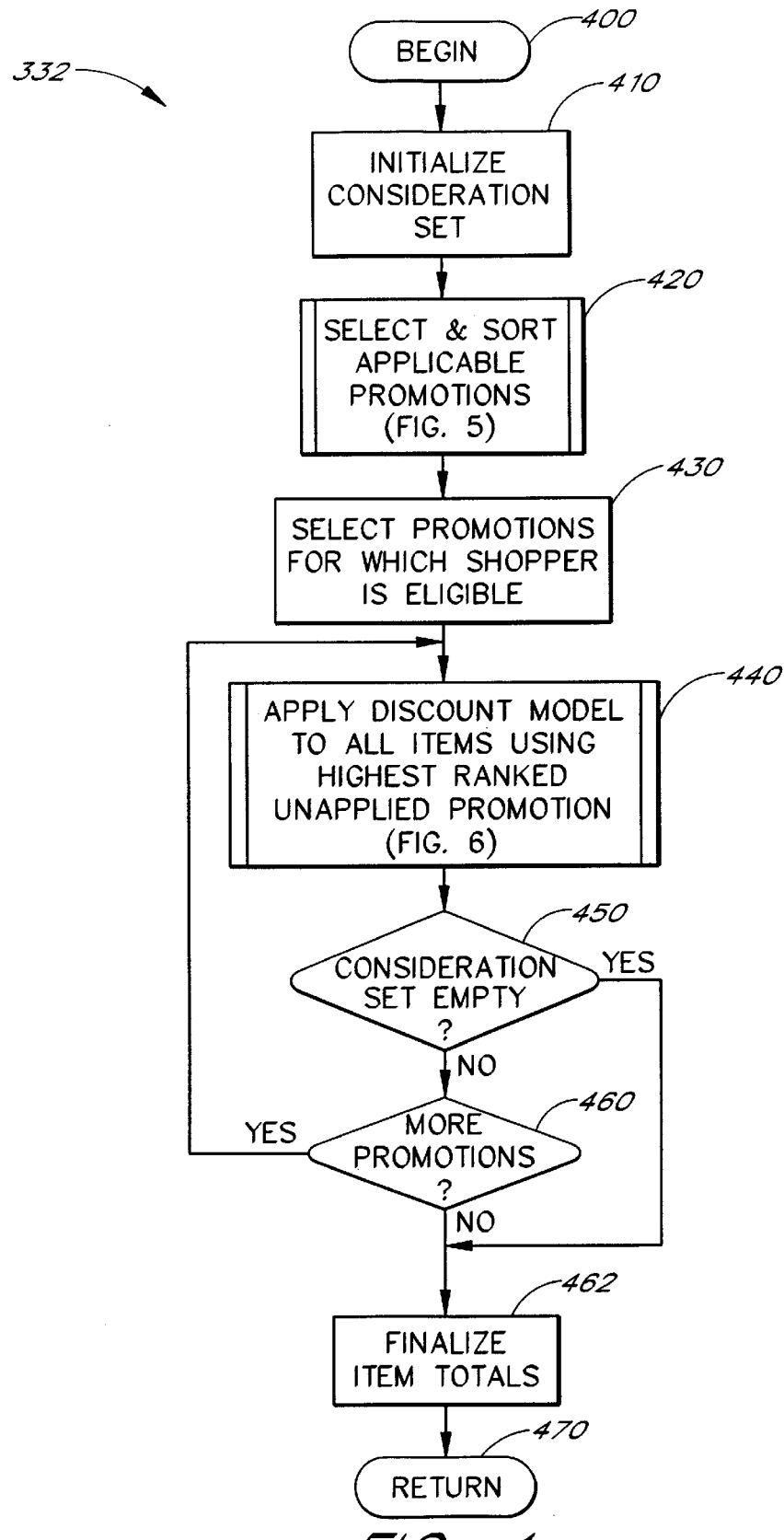
FIG. 4 illustrates a high level flow chart of one embodiment of the order price adjust promotion stage.

Referring to FIG. 4, the preferred embodiment proceeds from state 310 to a merchant information stage 314 which retrieves merchant-specific information from the database 54, 56. Next, a shopper stage 316 retrieves shopper information recorded in a shopper table from one of the databases 54, 56 and stores the information on the order. The shopper table format 1500 is illustrated in FIG. 15. In the preferred embodiment, the shopper table contains shopper identification codes. Each row corresponds to a particular shopper identification code while each column contains information related to the shopper identification code. For example, the preferred shopper table contains a column with the shopper identification code and a column which defines the date the shopper identification code was created. The shopper table is preferably merchant defined and can include a wide variety of information such as columns for the consumer's password and consumer preferences. The location of the shopper table is specified in the registry.

A shopper identification stored in the shopper's cookie may be used as the SQL key in retrieving the appropriate shopper information from the shopper table. Alternatively, a shopper password or account number may be used as the SQL key in retrieving the shopper information. The shopper information stored in the shopper table may include the shopper's age, sex, martial status, shopping preferences, membership status and other shopper datum. In the preferred embodiment, the information stored in the shopper table is defined by the storename_shopper schema in Microsoft SQL Server® format, as illustrated in Table III below.

TABLE III

SHOPPER SCHEMA

Schema: storename_shopper

| Field Name | Format |
| --- | --- |
| shopper_id | char(27) unique not null, |
| created | datetime not null, |
| is_member | tinyint null, |
| name | varchar(255) null, |
| street | varchar(255) null, |
| city | varchar(20) null, |
| state | varchar(20) null, |
| zip | varchar(10) null, |
| country | varchar(20) null, |
| phone | varchar(16) null, |
| email | varchar(255) unique null, |
| age | tinyint null, |
| gender | tinyint null, |
| marital_status | tinyint null, |
| salary_range | tinyint null, |
| size_shoe | varchar(20) null, |
| size_waist | varchar(20) null, |
| size_shirt | varchar(20) null, |
| favorite_color | varchar(20) null |

In the preferred embodiment, each shopper table column has a corresponding schema field associated with it. The storename shopper schema fields are defined as follows: "shipper_id is a unique shopper identification code; "created" is the date the shopper identification code was created; "is_member" indicates if the shopper is a store member; "name" is the shopper's name; "street", "city", "state", "zip", "country" fully specify the shopper's address; "phone" specifies the shopper's phone number; "email" specifies the shopper's email address; "age" specifies the shopper' age; "gender" specifies the shopper's gender; "marital_status" specifies the shopper's marital status; "salary_range" specifies the range of salaries within the shopper's salary falls; "size_shoe" specifies the shopper's shoe size; "size_waist" specifies the shopper's waist measurement; "size_shirt" specifies the shopper's shirt size; and "favorite_color" specifies the shopper's favorite color.

It is understood that the shopper schema could include either less fields or more fields than the schema illustrated in Table III. As an example, the shopper schema could include a shopper preference field "shopper_preference" which would specify a favorite type of item the shopper typically purchases. The shopper schema could also include fields for the shopper's social security number, names of children, favorite clothing designer, and so forth. In the preferred embodiment, for each added schema field there would be an additional corresponding shopper table column.

Once the shopper information is retrieved in stage 316, the preferred embodiment proceeds to the order initialization stage 320. The order initialization stage 320 copies order information, including the shopper's home address information for later tax calculation and the shipping address to calculate shipping costs, from the database 54, 56 onto the order 120. An order check stage 324 then verifies that the order can be processed by ensuring the order contains all the required elements for continued processing by the order processing pipeline 40.

The item price adjust stage 328 and an order price adjust stage 332 are the stages of the purchasing pipeline 132 used to apply promotions to the order. The item price adjust stage 328 has a component name SaleAdjust. The order price adjust stage 332 has a component name DbOrderPromo. A promotion may be in the form of a discount (also called an "award") for all purchased items, i.e., "10% off everything in the store", or a sale price for a particular item, "leather jackets normally $300, on sale at $200", or an award such as "buy a pair of shoes and get a pair of socks for free" or "buy a hat and get a pair of gloves for half price." Furthermore, an order may be eligible for multiple awards or promotions, giving a merchant the ability to optimize his sales strategy.

In the preferred embodiment, the item price adjust stage 328 determines for each item on the order 120 if the item may be eligible for a sale price on the day of the order. The item price adjust stage 328 is discussed in greater detail below.

An example of an order as received by the item price adjust stage 328 after processing by the preceding stages 310, 314, 316, 320, 324 is illustrated in FIG. 17. The order 1700 includes an order blackboard 1710, an hat item blackboard 1720, a red gloves item blackboard 1730, and a blue gloves item blackboard 1740. As discussed below, the order example illustrated in FIG. 17 is an order 1700 for seven hats, two pairs of red gloves, and two pairs of blue gloves.

Once the item price adjust stage 328 is complete, the order price adjust stage 332 applies sophisticated, merchant-generated rules to the order, determining the eligibility of the ordered items for multiple promotions. The order price adjust stage 332 then adjusts the price of each ordered item in accordance with a given promotion. In the preferred embodiment, if the item price adjust stage 328 set an item price to a sale price, then the promotion will be applied to the item using the sale price as the item price. The order price adjust stage 332 is discussed in greater detail below.

The preferred embodiment then proceeds to shipping stage 336 which calculates the total shipping charge for the order. Similarly, a handling stage 340 calculates the total handling charge for the order. A tax stage 344 then calculates the total tax for the order. An order total stage 348 computes that total charge for the order. An inventory stage 352 verifies that every ordered item is in stock. A payment stage 356 is used to approve credit-card payments. An accept stage 360 handles the completed order and passes a message that the order to be fulfilled.

IV. Implementation Of The Promotion Stages

The preferred embodiment of the present invention provides a unique system and method for providing merchandising promotions over publicly accessible on-line networks 24. In general, the promotions offered by a merchant can include temporary sale pricing, volume discounts, membership discounts and cross-purchasing awards. A cross-purchasing promotion in the preferred embodiment, is an incentive which offers a discount or award on a first product type, such as a pair of gloves, when the shopper purchases a second product type, such as a hat.

A. The Item Price Adjust Stage

In the preferred embodiment, the item price adjust stage 328 applies simple discounts, such as a sale price, to an item on the order, without reference to any other item on the order or the quantity of the item ordered. For example, the promotions which are applied by the item price adjust stage 328 may include the following promotion: "Brand X hat, normally $11, on sale at $9".

Figure 11:
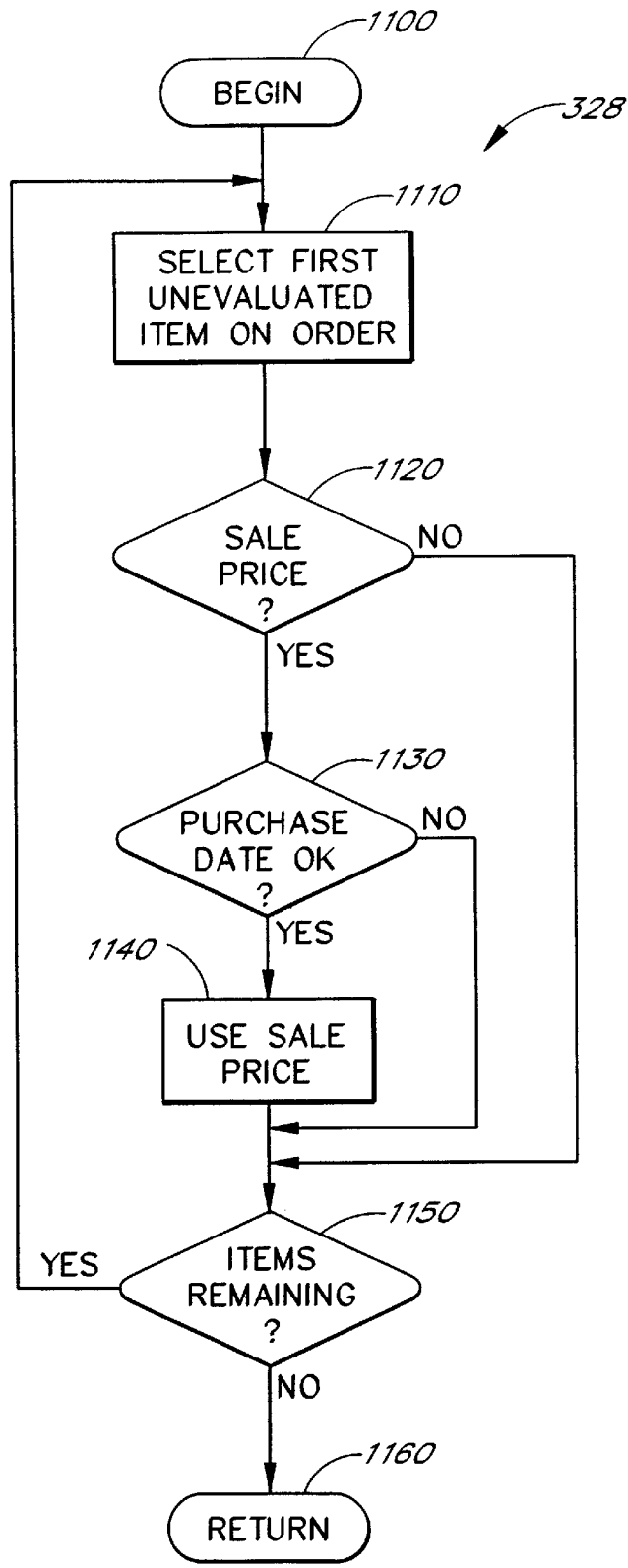
FIG. 11 illustrates a flow chart of one embodiment of the item price adjust promotion stage.

FIG. 11 is a flowchart illustrating the item price adjustment process in the preferred embodiment of the present invention. The item price adjust stage 328 reads the order 120 and for each item determines if the item is eligible for a sale price. Beginning at state 1100, the preferred embodiment proceeds to state 1110. The first item on the order is selected. Proceeding to state 1120, the preferred embodiment examines the sale_price column entry of the product table row associated with the item, to determine if there is a sale price defined for the item. If there is a sale price defined, the preferred embodiment proceeds to state 1130, which compares the current date of the item against the dates specified in the sale_start and sale_end fields. If the current date falls between the sale_start and sale_end dates, then the sale price is used as the current price for the item. Hence, the key-value current_price is set equal to the sale price. Thus, using the order illustrated in FIG. 17 as an example, referring to the hat item blackboard 1720, if the current date is between 10-01-1999, the date specified by the sale_start entry, and 3-1-2000, the date specified by the sale_end entry, then the current price current_price of the hat item is set equal to the sale_price entry of $9. (In the examples described below, the current_value of the hat item is assumed to be $9) Otherwise, if the current date does not fall within the range of the sale_start and sale_end dates, then the price specified in the list_price field is used as the current price for the item. Hence, in this situation, the key-value current_price is set equal to the list price.

If, instead, there is no sale price specified in the sale_price field, then the preferred embodiment proceeds directly from state 1120 to state 1150. Similarly, if the current date does not fall within the range of the sale_start and sale_end dates, then the preferred embodiment proceeds directly from state 1130 to state 1150. In both the aforementioned cases, the price specified in the list_price field is used as the item price. Thus, using the order example illustrated in FIG. 17, since the red glove item blackboard 1720 and the blue glove item blackboard 1730 do not have sale start dates then the current price current_price of the red glove item is set equal to the corresponding list_price of $5, and the current price current_price of the blue glove item is set to the corresponding list_price of $6.

In another preferred embodiment, multiple simple promotions may be applied by the item price adjust stage 328. In this embodiment, the item will be evaluated to determine its eligibility for each promotion. If the item is eligible for a promotion, then the current_price is set equal to the promotion price. If, however, the item is not eligible for any promotion, the current_price value is left blank by each promotion. In this case, the item price adjust stage 328 sets the current_price value equal to the list_price value before the preferred embodiment proceeds to the next stage in the order pipeline 132.

In state 1150 a determination is made if there are unevaluated items remaining on the order blackboard. If there are unevaluated items remaining, the preferred embodiment loops back to state 1110. Otherwise, the preferred embodiment proceeds to state 1160.

B. The Order Price Adjust Stage

The operation of the order price adjust stage 332 will now be described. The order price adjust stage 332 applies complex promotions to the order, taking into account shopper information, the quantity or dollar values of the items ordered, the types of items ordered, and so on. Furthermore, the order price adjust stage 332 permits the merchant to offer cross-purchasing incentives, such as "buy a pair of shoes and get a pair of socks for free".

In the preferred embodiment, the order price adjust stage 332 retrieves a merchant-defined promotion table stored in one of the merchant system databases 54, 56. The promotion table contains rows and columns. The table contains merchant generated rules for applying promotions. FIG. 16 illustrates a preferred embodiment of the promotion table format 1600. Each row of the promotion table 1600 advantageously represents a different promotion, while the columns represent fields associated with, and defining the promotions. Table IV, below, defines in Microsoft SQL Server® format a promotion table schema, including the field associated with each column of the promotion table in the preferred embodiment. Once the promotion table has been retrieved, the field entries are used by order price adjust stage 332 in applying the promotions to the order, as described below.

TABLE IV

PROMOTION TABLE

| Column Name | Format | Description |
| --- | --- | --- |
| promo_id | int primary key | Unique id of this entry. |
| promo_name | varchar(255) unique | Name for the promotion. |
| promo_description | text | Description of the promotion that will be shown to shoppers. |
| promo_rank | int | Rank of this promotion; this determines the order in which the promotion will be applied to the purchase. The higher the rank, the sooner it will be applied. When a promotion has been applied, any product in either the condition set or the award set is removed from further consideration for additional promotions. |
| active | tinyint | A code indicating whether or not this promotion is currently active; this is a convenience to the |

TABLE IV-continued

PROMOTION TABLE

| Column Name | Format | Description |
| --- | --- | --- |
| | | merchant that enables them to keep promotions in the system without having them be active. |
| date_start | datetime | The date at which the promotion goes into effect. |
| date_end | datetime | The date until which the promotion is in effect. |
| shopper_all | int | Indicates whether or not this promotion is available to all shoppers. |
| shopper_column | varchar(64) | If shopper_all is false, then shopper_column specifies which field in the shopper record will be used to determine whether a shopper is eligible for the promotion. |
| shopper_op | varchar(2) | If shopper_all is false, then shopper_op will be used as the operand in the comparison to determine whether a shopper is eligible for the promotion; it will be one of ">", "<", "=", ">=", "<=", "!=". |
| shopper_value | varchar(64) | If shopper_all is false, then shopper_value will be used as the reference value in the comparison to determine whether a shopper is eligible for the promotion. |
| cond_all | int | If cond_all is true, then any product in the set of products to be purchased will trigger this promotion. |
| cond_column | varchar(64) | If cond_all is false, then cond_column specifies which field in the product record will be used to determine whether a product will trigger this promotion. |
| cond_op | varchar(2) | If cond_all is false, then cond_op will be used as the operand in the comparison to determine whether a product will trigger the promotion; it will be one of ">", "<", ">=", "<=", "!=". |
| cond_value | varchar(64) | If cond_all is false, then cond_value will be used as the reference value in the comparison to determine whether a product will trigger the promotion. |
| cond_basis | char(1) | This determines what to use as the basis for calculating eligibility for the promotion. It will be either "Q", which means a minimum number of units must be purchased, or "P", which means that a minimum dollar amount must be purchased. |
| cond_min | int | This specifies the minimum number of units or the minimum dollar amount that must be purchased to trigger the promotion. |
| award_all | int | If this is true, then the award can be applied to any product. |
| award_column | varchar(64) | If award_all is false, then award_column specifies which field in the product record will be used to determine whether a product is eligible to be the target of the award. |
| award_op | varchar(2) | If award_all is false, then award_op will be used as the operand in the comparison to determine whether a product is eligible to be the target of the promotion; it will be one of ">", "<", "=", ">=", "<=", "!=". |
| award_value | varchar(64) | If award_all is false, then award_value will be used as the reference value in the comparison to determine whether a product will be eligible as the target of the promotion. |
| award_max | int | Indicates the maximum number of products in the award set that are eligible to be the target of the award. |
| disc_type | char(1) | A value that is either "$", indicating a fixed dollar amount off, or "%", indicating a percentage off. |
| disc_value | decimal(8,2) | The amount of the discount, either as amount off or as percentage off. |

Table V illustrates an example of a hat promotion using the schema illustrated in Table IV. The promotion has a promotion identification promo_id equal to "999". The promotion name promo_name is "Hat promotion", and the promotion description promo_description is "buy two hats and get a pair of gloves at half the current price!". The hat promotion may be just one of multiple promotions in a corresponding promotion table. The hat promotion illustrated in Table V is used below to illustrate a preferred embodiment of the present invention.

TABLE V

HAT PROMOTION

| Column Name | Value |
| --- | --- |
| promo_id | 999 |
| promo_name | Hat promotion |
| promo_description | Buy two hats and get a pair of gloves at |

TABLE V-continued

HAT PROMOTION

| Column Name | Value |
|---|---|
|  | half the current price! |
| promo_rank | 1 |
| active | 1 |
| date_start | 12-01-1999 |
| date_end | 01-31-2000 |
| shopper_all | 0 |
| shopper_column | is_member |
| shopper_op | > |
| shopper_value | 0 |
| cond_all | 0 |
| cond_column | sku |
| cond_op | = |
| cond_value | 1234 |
| cond_basis | Q |
| cond_min | 2 |
| award_all | 0 |
| award_column | dept_id |
| award_op | = |
| award_value | 11111 |
| award_max | 1 |
| disc_type | % |
| disc_value | 50 |

Figure 18:
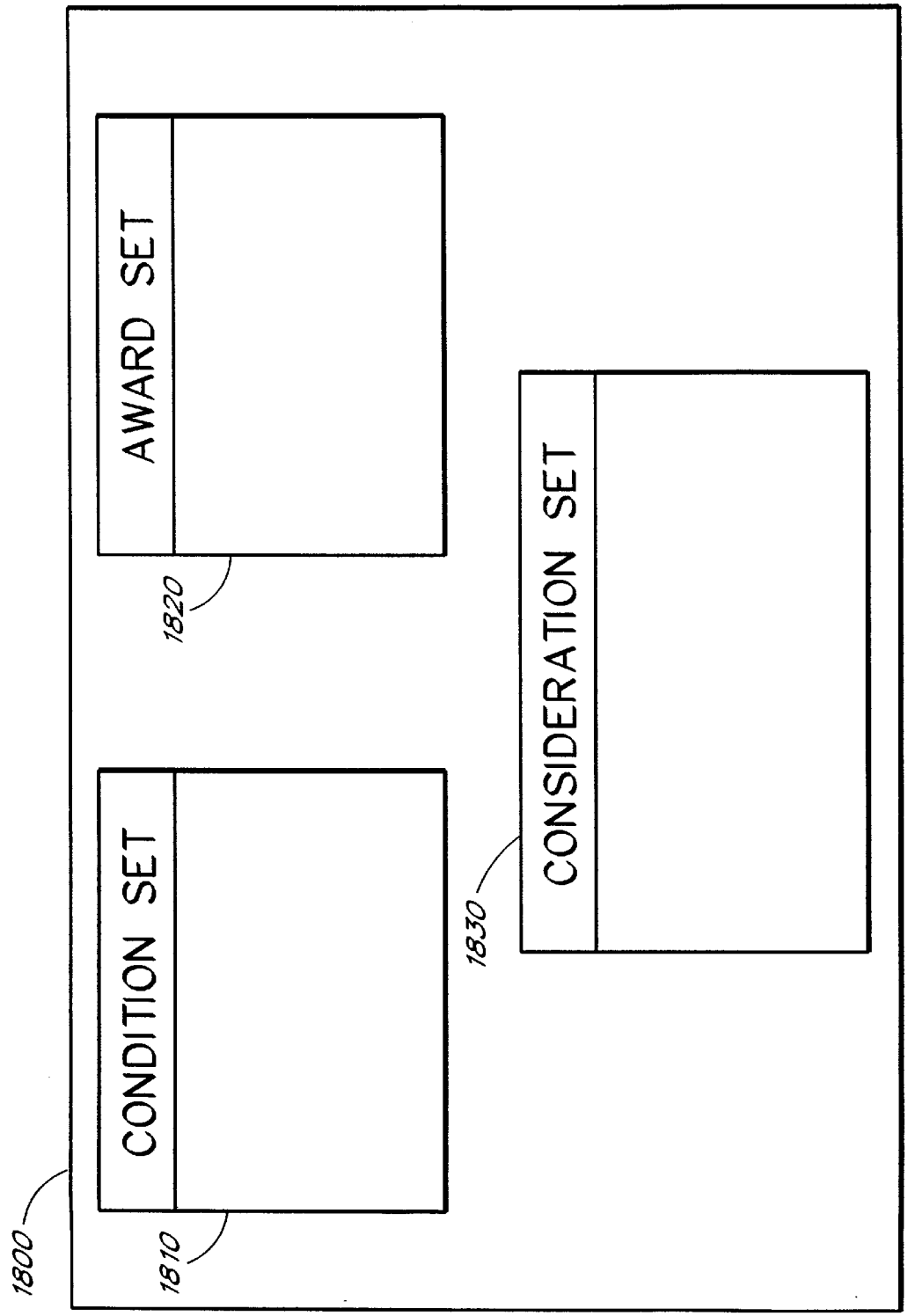
FIG. 18 illustrates the data structures residing in memory in accordance with one embodiment of the present invention.

FIG. 4 is a high level flow chart illustrating the sequence of states occurring in the preferred embodiment of the order price adjust promotion stage 332. Beginning in a start state 400, the preferred embodiment proceeds to state 410. In state 410, a consideration set of all products to be considered for promotions is initialized to the complete set of items being on the order. The consideration set 1830, as well as a condition set 1810, and an award set 1820, are used to apply promotions to an order, as described below. In the preferred embodiment, the consideration set 1830, the condition set 1810, and the award set 1820, reside in memory 1800, as illustrated in FIG. 18.

The consideration set is the set of order items that are evaluated when applying a promotion. Thus, initially all items on the order 120 are included in the consideration set for determining their eligibility for promotions. Using the order example illustrated in FIG. 17, the consideration set initially includes all items on the order (7 hats, 2 pairs of red gloves, and 2 pairs of blue gloves).

After the consideration set is initialized, the preferred embodiment performs an SQL query, retrieving the promotion table records describing a given store's promotions, from the appropriate store database. Proceeding to state 420, a subset of the promotions within the promotion table are selected for further evaluation, and the selected promotions are sorted in the manner described below.

Figure 5:
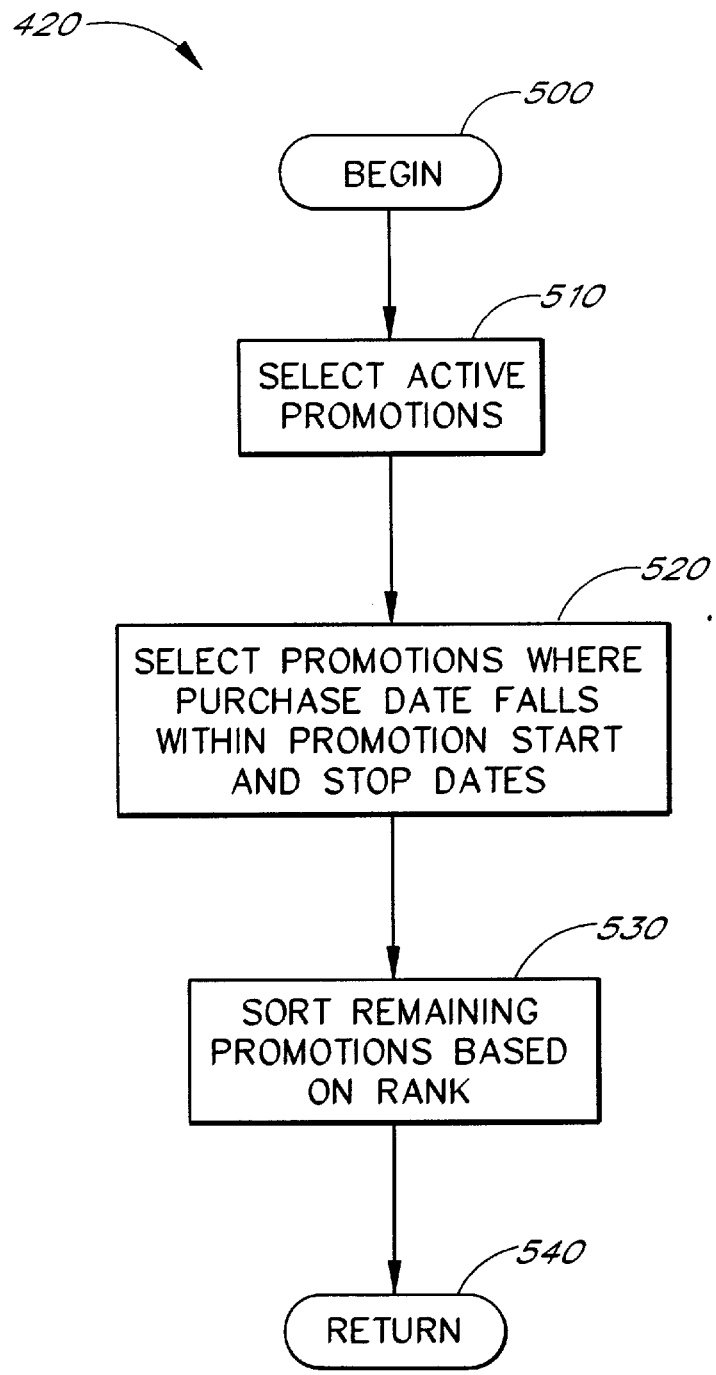
FIG. 5 illustrates a detailed flow chart of one embodiment of the selection and sorting of promotions.

Referring now to FIG. 5, a detailed flow chart further illustrates the selection and sorting process of state 420. Beginning in state 500, the preferred embodiment proceeds to state 510 where promotions, whose "active" column entry indicates are active, are selected. If the entry in the "active" column is a greater than zero, then the promotion is active and the promotion is selected. Thus, for example, the hat promotion illustrated in Table V would be selected, since its "active" column entry is set to a "1". If the "active" column entry is set to a "0", then the promotion is not active and hence is not selected. In the preferred embodiment, the active column entry has been set by the merchant using an administrative promotion form described below to indicate which promotions should be selected.

Proceeding to state 520, the date of the purchase is compared to the respective start date, from the promotion table date_start column, and the respective end date, from the promotion table date_end column, of each selected promotion. If the current date falls within the start and end dates of a given promotion, then that promotion is selected for further consideration. Thus, using the hat promotion illustrated in Table V as an example, if the order is placed on Jan. 1, 2000, since the start date of the hat promotion is Dec. 1, 1999, and the end date of the hat promotion is Jan. 31, 2000, then the current date falls between the promotion start and stop date. Therefore, the hat promotion will be selected. If, instead, the order is placed on Jan. 1, 2000 and the start date of a given promotion is Jan. 15, 2000 and the end date of the promotion is Jan. 31, then the current date falls outside of the promotion start and stop dates. Therefore, that promotion will be not selected.

Proceeding to state 530, the remaining selected promotions are sorted in ascending order based on the merchant-specified integer rank entry in the promo_rank column of each of the selected promotions. In the preferred embodiment, the promotion with the lowest numerical rank number is the highest ranking promotion. Thus, for example, the hat promotion illustrated in Table V, would be the highest ranked promotion in a promotion table as it has a rank entry of "1" in the promo_rank column. The preferred embodiment then proceeds to the return state 540.

Referring to FIG. 4, once state 420 is completed, the preferred embodiment proceeds to state 430. Each promotion in the promotion table is evaluated to determine if the shopper is eligible for the promotion. Referring to the schema illustrated in Table IV, four entries associated with four column data fields from the promotion table define shopper eligibility. The four column data fields include: the shopper_all field, the shopper_column field, the shopper_op field, and the shopper_value field.

First, the shopper_all data field for each promotion is examined. If the shopper_all entry indicates that all shoppers are eligible for the promotion, then that promotion is selected for further evaluation. Otherwise, shopper eligibility for each promotion is determined by evaluating the corresponding entries in the shopper_column field, the shopper_op field, and the shopper_value field using Equation 1, as follows:

Shopper is eligible if: (1)

shopper[shopper_column] shopper_op shopper_value=true

Equation 1 compares the value specified by the shopper column entry with the shopper_value entry, using the operator specified in the shopper_op entry.

The shopper_column field specifies which field in the shopper record (See Table III) will be used in the above comparison to determine shopper eligibility for the promotion. The shopper_value field entry will be used as a reference value in the comparison for the shopper eligibility determination. The shopper_op field specifies the operand (>, <, −, >=, <=, !=, in the preferred embodiment) used in the comparison for the shopper eligibility determination. In an alternate embodiment, shopper eligibility is determined using a more complex equation than that illustrated by Equation 1, using boolean functions, such as AND, OR, XOR operators, as well as other mathematical functions. Those promotions for which the shopper is eligible are selected for further evaluation.

If, as in the hat promotion example illustrated in Table V, the merchant wishes to restrict shopper eligibility for the promotion to only those shoppers who have a store membership, the merchant would set the column data field entries from the promotion table defining shopper eligibility as follows: the shopper_column entry would be set to specify the membership field, "is_member," of the shopper record. Any value greater than zero in the "is_member" field indicates the shopper is a store member. The shopper_value field entry would be set to specify a "0" as the reference field, and the shopper_op field entry would be set to specify the ">" operator. Therefore, a shopper is eligible for the promotion only if the value stored in the shopper record membership field, "is_member", is greater than "0", indicating the shopper is a member. Thus, for example, the order illustrated FIG. 17, meets the shopper criteria as the shopper_id entry in the order blackboard 1710 is equal to "1".

In another example, a promotion could be restricted to one specific shopper by setting the column entries as follows: the shopper_column entry is set to specify the membership number field "shopper_id", the shopper_value entry is set to "1000". If the shopper_op field entry is the "=" operator, then only a shopper having the unique membership number of "1000" would be eligible for the promotion. If, instead, in this example, the shopper_op entry is the "<" operator, then only those shoppers whose membership number is less than 1000 would be entitled to the discount. Thus, a promotion can be easily restricted to members of long duration, i.e., those members with low membership numbers.

In another example, the merchant of a record store may want to target a promotion only at regular purchasers of jazz albums. In this case the shopper_column entry could specify a shopper preference field "shopper_preference" in the shopper record. In this example, the shopper_value is set to "jazz". If the shopper_op field entry is the "=" operator, then only a shopper having the shopper_preference field equal to "jazz" would be eligible for the promotion. Thus, a promotion could be restricted to jazz music lovers.

Accordingly, in the preferred embodiment, a merchant can advantageously target feature products to specific customers based on a variety of criteria, including store membership, geographical location, demographic information such as gender and age, or shopper preferences, such as favorite musical genres. A merchant has complete flexibility in specifying numerous criteria, beyond the aforementioned categories, in defining shopper eligibility.

Once all the promotions in the promotion table have been evaluated for shopper eligibility, the preferred embodiment proceeds to state 440. In state 440 the highest ranked selected promotion which has not yet been applied to the order is now applied. For example, the hat promotion illustrated in Table V has a rank of "1", thus it would be the first promotion to be applied. As will be described in greater detail below, the order is evaluated, and if the order meets promotion eligibility requirements, then appropriate awards are granted on corresponding items in the order. Any items from the order which have been used to qualify for an award or had an award applied to them may be preferably removed from the consideration set as described below. Note, that in the preferred embodiment, the application of a sale price to an item in the item price adjust stage 328 does not act to remove the product from the consideration set.

In another embodiment, the merchant may specify that items used to qualify for an award or had an award applied to them may remain in the consideration set, as described below.

The order price adjust stage 332 then proceeds from state 440 to state 450 where it determines if the consideration set is empty. If the consideration set is empty, and thus there are no items on the order which may be eligible for promotions, the price adjust stage 332 proceeds to state 462.

If, instead, there are items remaining in the consideration set, then the preferred embodiment proceeds to state 460 which determines if there are unapplied promotions remaining in the promotion table. If there are no unapplied promotions remaining, the preferred embodiment proceeds to state 462. If, however, there are unapplied promotions remaining in the promotion table, then the preferred embodiment loops back to state 440, where the highest ranked unapplied promotion is now applied. The values, n_condition and n_award, will be initialized to zero before they are used by the promotion. The order price adjust stage 332 will loop from state 440 through state 460 until there are either no items remaining in the consideration set or no remaining unapplied promotions.

Figure 6:
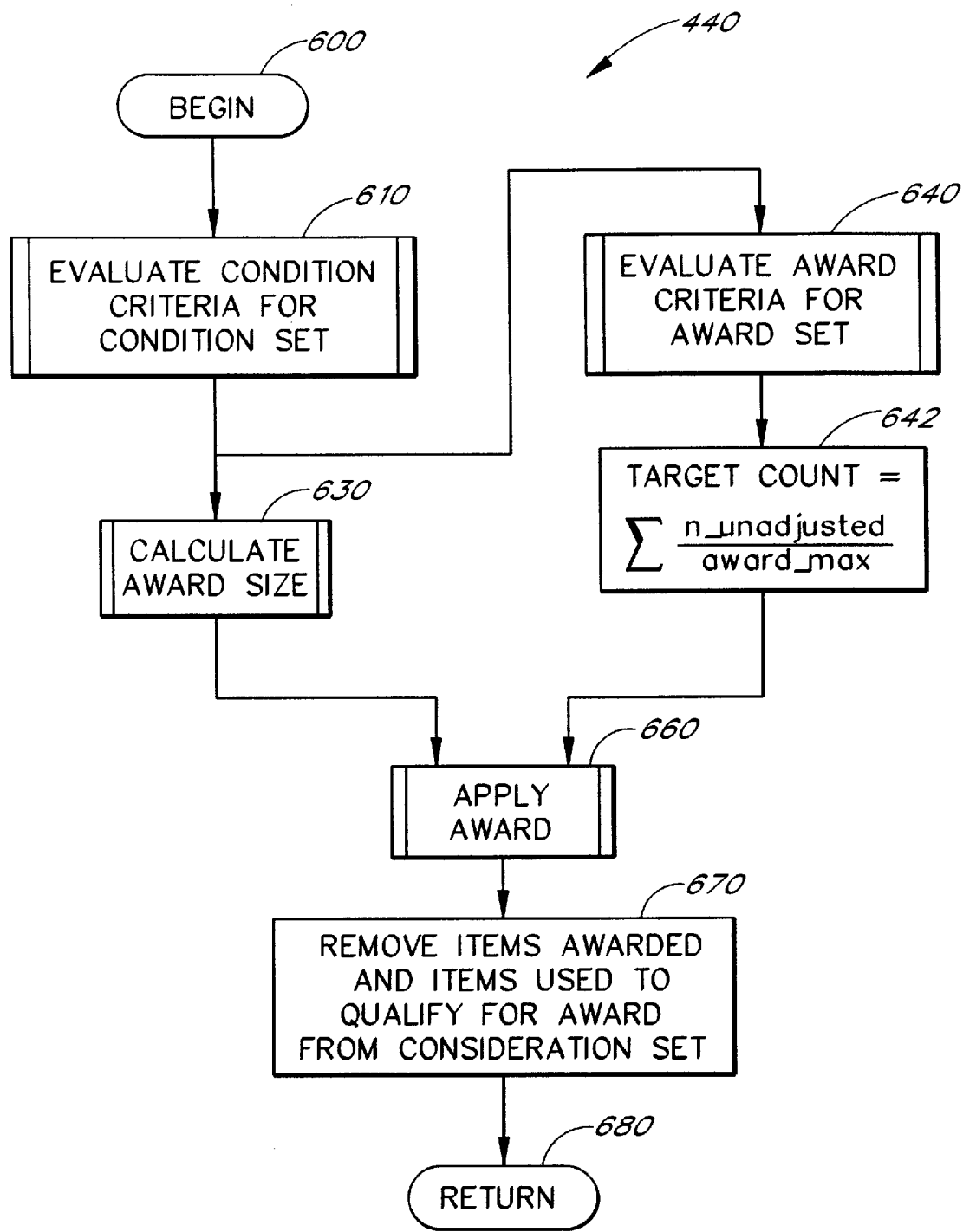
FIG. 6 illustrates a detailed flow chart of one embodiment of the application of a promotion.

Referring now to FIG. 6, a detailed flow chart of one preferred embodiment further illustrates the promotion application process of state 440. Beginning in state 600, the preferred embodiment proceeds to state 610. State 610 evaluates whether items in the consideration set satisfy condition criteria as defined in the promotion table and are therefore eligible to trigger a promotion and earn an award. If an item from the consideration set satisfies the condition criteria, the item is placed in the condition set. The condition set includes all those order items meeting the criteria for triggering the promotion under consideration.

Figure 7:
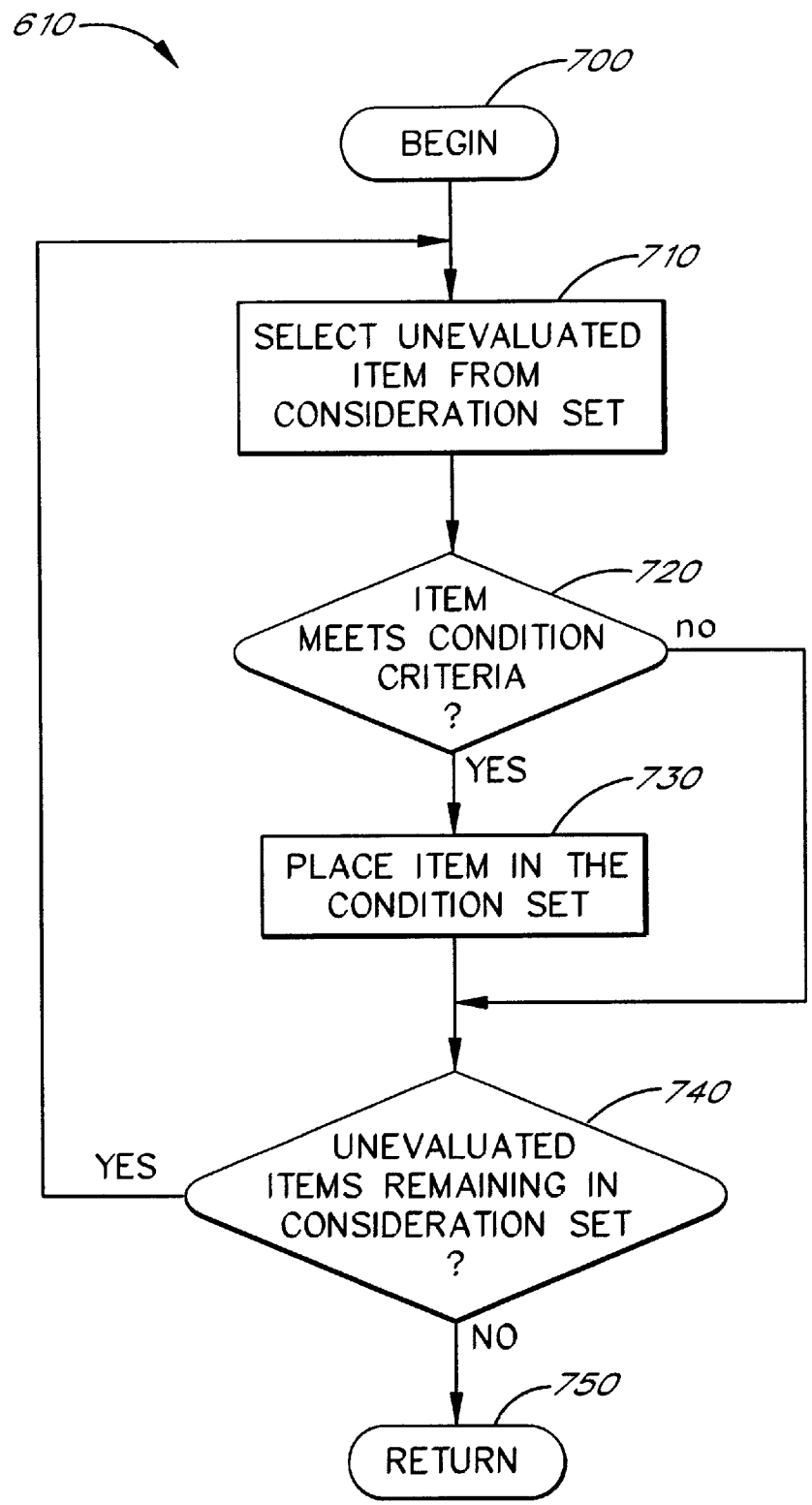
FIG. 7 illustrates a detailed flow chart of one embodiment of the condition set criteria evaluation.

Referring now to FIG. 7, a detailed flow chart further illustrates the criteria evaluation process of state 610. Beginning in state 700, the preferred embodiment proceeds to state 710. An order item which has not yet been evaluated using the promotion condition set criteria is selected from the consideration set. Proceeding to state 720, the item is evaluated using the promotion table criteria to determine the item's eligibility in triggering the promotion.

Referring to the schema illustrated in Table IV, six entries associated with six column data fields from the promotion table define the condition criteria. The six column data fields include: the cond_all field, the cond_column field, the cond_op field, the cond_value field, the cond_basis field, and the cond_min field. First, the cond_all data field for each promotion is examined. If the cond_all entry indicates that all items are eligible for the promotion, then the preferred embodiment proceeds to state 730, and all items in the consideration set are placed in the condition set. Otherwise, the entries in the cond_column field, the cond_op field, and the cond_value field must be evaluated using Equation 2 to determine if the item may be placed in the condition set:

$$\text{Place item in condition set if:} \quad (2)$$
$$\text{product[cond\_column] cond\_op cond\_value}=\text{true}$$

Equation 2 compares the value specified by the cond_column entry with the cond_value entry, using the operator specified in the cond_op entry.

The cond_column field specifies which field in the product record, as defined by the record schema illustrated in Table I, will be used in the above mentioned comparison to determine whether an item will trigger the promotion. The cond_value field entry will be used as a reference value in the comparison. The cond_op field specifies the operand (>, <, −, >=, <=, !=) used in the comparison. In an alternate embodiment, the condition set is determined using a more complex equation than that illustrated by Equation 2, using boolean functions, such as AND, OR, XOR operators, as well as other mathematical functions. Proceeding to state 730, those items which satisfy the Equation 2 are placed in the condition set.

Using the condition criteria, the merchant can advantageously limit triggering of the promotion, for example, to cases where the shopper buys a specific product with a sku equal to the specified reference field entry. Thus, as in the hat promotion example illustrated in Table V, if the merchant desires to trigger the promotion only when the shopper orders a hat having a sku equal to "1234", he would set the cond_column field to specify the sku column of the product record, the cond_value field to specify "1234" as the reference field, and the cond_op field to specify "=". Therefore, an ordered item meets the condition criteria only if the value stored in the product's sku field equals "1234". Applying the hat promotion, illustrated in Table V, to the order illustrated in FIG. 17, only the hat item blackboard 1720 has a sku equal to "1234" and thus only the hat item meets the hat promotion's condition criteria. The red gloves item blackboard 1730 and the blue gloves item blackboard have skus equal to "5678" and "5679" respectively, and hence do not meet the hat promotion's condition criteria.

In another example, if the merchant desires to restrict the triggering of the promotion to cases where the shopper purchases an item from a specific department, such as for example a music department, he would set the cond_column field to specify the department field, "dept_id", of the product record, the cond_value field to specify the music department's identification number, "456" in this example, as the reference field, and the cond_op field to specify "=". Therefore, an ordered item meets the condition criteria for triggering the promotion only if it is purchased from the music department.

If an item meets the condition criteria the preferred embodiment proceeds to state 730, where the item is placed in the condition set, and then proceeds to state 740. Otherwise, the preferred embodiment proceeds directly from state 720 to state 740. State 740 determines if there are any items remaining the consideration set which have not yet been evaluated using the condition criteria. If there are unevaluated items remaining in the consideration set, then the preferred embodiment loops back to state 710 so that the remaining items may be evaluated. If, instead, there are no unevaluated items remaining in the consideration set, then the preferred embodiment proceeds to state 750.

Referring to FIG. 6, the preferred embodiment proceeds from state 610 to state 630 and state 640. In state 630 an award size is calculated based on the items in the condition set and upon entries in the promotion table, as described below. In state 640 each item in the consideration set is evaluated using award criteria to determine if the item may be eligible to receive an award or discount calculated in stage 630.

Figure 9:
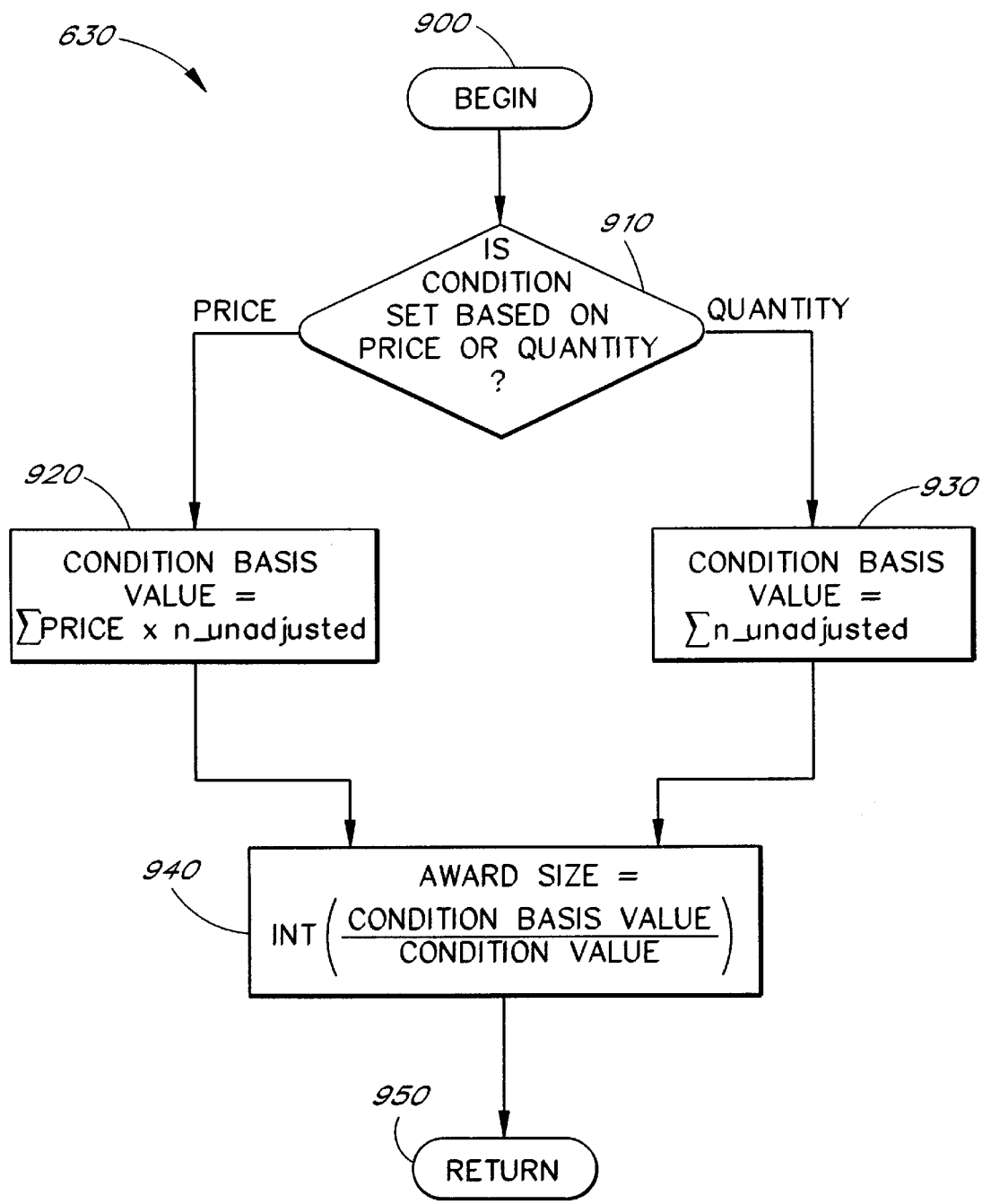
FIG. 9 illustrates a detailed flow chart of one embodiment of the award size calculation.

Referring now to FIG. 9, a detailed flow chart further illustrates the preferred embodiment of the award calculation process of state 630. Beginning in state 900, the preferred embodiment proceeds to state 910. State 910 evaluates the cond_basis field entry of the promotion table. The condition_basis field specifies whether the basis for calculating promotion eligibility is based on a minimum number of item units which must be purchased or whether a minimum dollar amount of items must be purchased. If the promotion eligibility is based on quantity, then the cond_basis field entry will be set to a "Q". If the promotion eligibility is based on a minimum dollar amount, the cond_basis entry is set to a "P".

If the cond_basis entry is set to a "Q", for quantity, as is the case in the hat promotion example illustrated in Table V, the preferred embodiment proceeds to state 930. State 930 calculates the variable "Condition Basis Value" for each item, which is equal to the sum of the n_unadjusted value of each item in the condition set. The key-value n_unadjusted represents the quantity of the corresponding item which has not yet been used in triggering an award or in receiving an award. Thus, for example, applying the hat promotion to the order illustrated in FIG. 17, since only the hat item is in the condition set, the "Condition Basis Value" is equal to the value of n_unadjusted for the hat item, which is 7.

If, instead, the cond_basis entry is set to a "P", for price, the preferred embodiment proceeds to state 920. State 920 calculates a variable "Condition Basis Value" for each item which is equal to the sum of the product of the current price of each item in the condition set and the value of n_unadjusted corresponding to each item.

Once the variable "Condition Basis Value" is calculated, the preferred embodiment proceeds to state 940, where the variable "Award Size", representing the award size, is calculated. In the preferred embodiment, the "Award Size" variable is set equal to the integer value of the division of the "Condition Basis Value" variable by a "Condition Value" variable, as illustrated in Equation 3. The "Condition Value" variable is equal to the cond_min field entry in the promotion table, which appropriately specifies either the minimum number of units or the minimum dollar amount of items in the condition set which must be purchased to trigger the promotion.

$$\text{Award Size}=\text{integer value of (Condition Basis Value/Condition Value)} \tag{3}$$

Thus, by setting the award size equal to the integer value of the division of the "Condition Basis Value" variable by the "Condition Value" variable, the merchant is assured that the award size is rounded down to the nearest integer value. This prevents a shopper from receiving an award greater than he is entitled to. In another embodiment, the award size may be rounded up to the nearest integer value, ensuring that the shopper will receive the maximum possible award. In still another embodiment, the merchant may select whether the award size may be rounded up or down to the nearest integer number. In the preferred embodiment, the award size is stored in a data structure which may reside in memory.

An example of the award size calculation will now be described using the order illustrated in FIG. 17 and the hat promotion illustrated in Table V. As calculated above, the "Condition Basis" is equal to the value of n_unadjusted of the hats, which is this example equals 7. In the hat promotion example illustrated in Table V, the cond_min field entry is equal to 2.

The award size is as follows:

$$\text{Award Size}=\text{The integer value of (7/2)}$$

Which, when evaluated, sets the award size equal to 3. Once the award size is calculated, the preferred embodiment proceeds to state 950.

Figure 8:
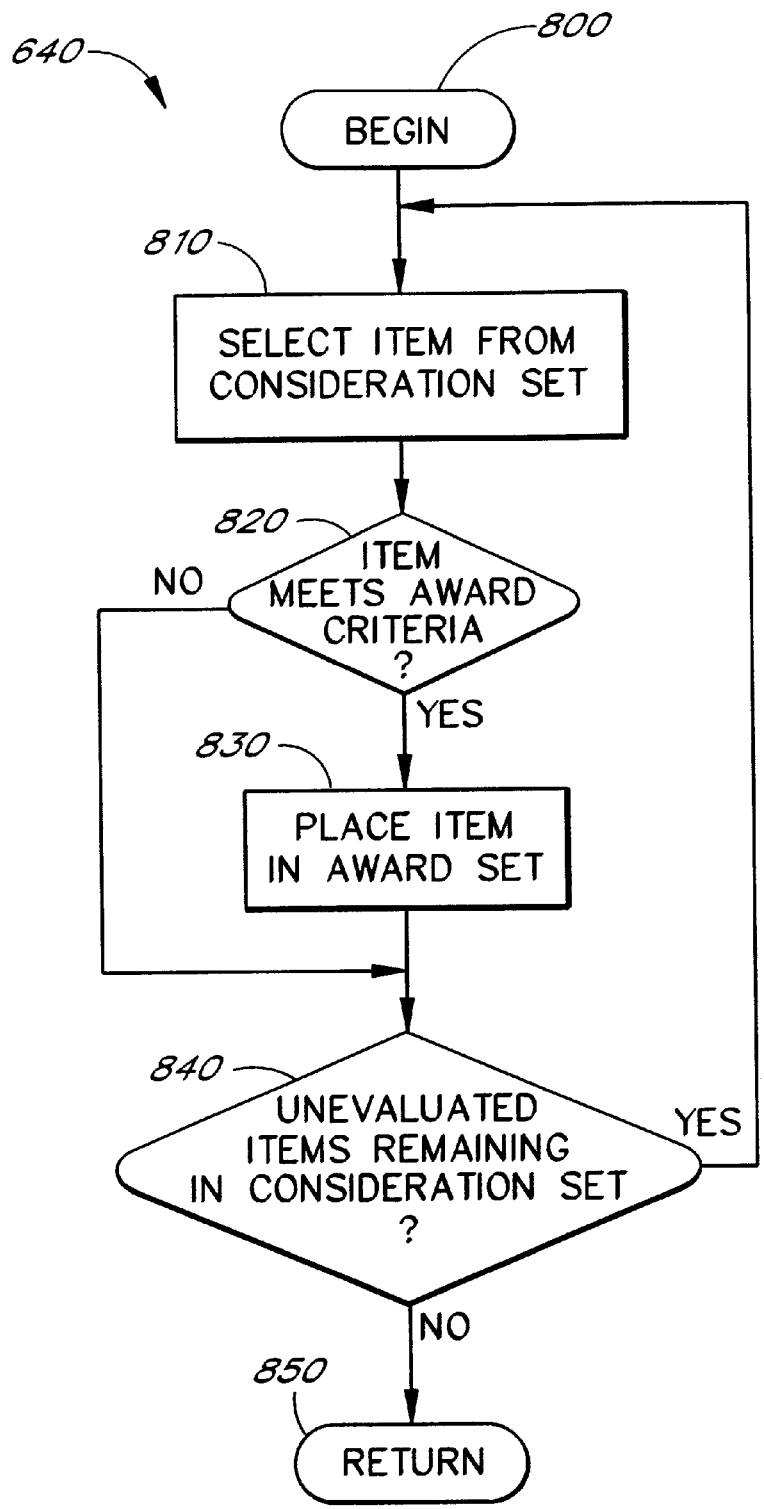
FIG. 8 illustrates a detailed flow chart of one embodiment of the award set criteria evaluation.

Referring now to FIG. 8, a detailed flow chart further illustrates a preferred embodiment of the award criteria evaluation process of state 640 in FIG. 6. Beginning in state 800, the preferred embodiment proceeds to state 810. An item which has not yet been evaluated against the promotion award set criteria is selected from the consideration set. Proceeding to state 820, the item is then evaluated using the promotion award criteria from the promotion table for the promotion currently being considered. A determination is made of the item's eligibility to receive the award for the promotion being considered.

As illustrated in Table IV, four entries associated with four column data fields from the promotion table define the award criteria. The four data fields include: the award_all field, the award_column field, the award_op field, and the award_value field. First, the award_all data field for the promotion being considered is examined. If the award_all entry indicates that all items are eligible to be the target of the award, then, proceeding to state 830, the selected item is automatically placed in the award set. The award set includes all those order items eligible to receive an award. An item may be both in the award set and the condition set. Thus, for example, if the promotion is "buy two pairs of shoes, get one pair of shoes at half price", then shoes may be in the condition set, i.e., the shoes trigger the promotion and earn awards, and the shoes may be in the award set, i.e., the shoes are target of the award.

If the award_all entry indicates that all items are not eligible to be the target of the award, the entries in the award_column field, the award_op field, and the award_value field must be evaluated using Equation 4, below, to determine if the item may be placed in the award set:

$$\text{Place item in award set if:} \quad (4)$$
$$\text{product[award\_column] award op award\_value=true}$$

Equation 4 compares the value specified by the award_column entry with the award_value entry using the operator specified in the award_op entry.

The award_column field specifies which field in the product record will be used in the comparison to determine whether an item is eligible to receive a promotion. The award_value field entry will be used as a reference value in the comparison. The award_op field specifies the operand (>, <, −, >=, <=, !=) used in the comparison. In an alternate embodiment, the award set is determined using a more complex equation than that illustrated by Equation 4, using boolean functions, such as AND, OR, XOR operators, as well as other mathematical functions. Those items which satisfy the Equation 4 are placed in the award set in state 830.

In applying the promotion under consideration, the type of award or discount is determined before the award is applied. The award is defined by the disc_type field and the disc_value field of the promotion table illustrated in Table IV. The disc_type field specifies whether the award is a fixed dollar amount off the product receiving the award, or a percentage off the price of the product receiving the award. The disc_value field specifies the amount of the discount, either as a percentage or as a dollar amount. The promotion table's award_max field specifies the maximum number of products in the award set that are eligible to be the target of the award.

Using the award criteria, the merchant can limit the granting of awards, for example, to a specific product. If, as for the hat promotion illustrated in Table V, the merchant desires to target an award only to a product from a specific department, such the glove department, having a dept_id of "111111", he sets the award-related field entries as follows: the award_column field is set to specify the department identification code "dept_id", the award_op field is set to "=", and the award reference field award_value is set to "11111". Thus, a item may receive an award only if it has a dept_id entry equal to "11111". Applying the hat promotion illustrated in Table V to the order illustrated in FIG. 17, both the red glove and blue glove items 1730, 1740 have a dept_id equal to "11111", and thus both the red glove and blue glove items may receive awards. In contrast, the hat item has a dept_id equal to "55555" and thus does not meet the award criteria. Therefore, the hat item is not eligible to receive an award.

If an item meets the award criteria, the preferred embodiment next proceeds to state 830, where the item is placed in the award set. Applying the hat promotion illustrated in Table V to the order illustrated in FIG. 17, both the red glove and blue glove items are placed in the award set. The preferred embodiment then proceeds to state 840. If the item being considered does not meet the award criteria, the preferred embodiment proceeds directly from state 820 to state 840. State 840 determines if there are any items remaining in the consideration set which have not yet been evaluated using the award criteria. If there are unevaluated items remaining in the consideration set, then the preferred embodiment loops back to state 810 so that the item may be evaluated using the award criteria. If, instead, there are no unevaluated items remaining in the consideration set, then the preferred embodiment proceeds to state 850.

Once the award set is determined, the preferred embodiment proceeds to state 642. In state 642 the target count is calculated. The target count is equal to the sum of the value of n_unadjusted (the quantity of each item which has not been the target of an award and which has not earned awards which have been applied) for each item in the award set, divided by the award_max entry. The result of the calculation is then rounded-up to the nearest integer, ensuring the order items receive the appropriate award, as illustrated in Equation 5:

$$\text{Target Count=rounded-up(n\_unadjusted\_award\_max)} \quad (5)$$

The award_max entry indicates the maximum number of items which may receive a discount for each award earned. Thus, for example, applying the hat promotion to the order illustrated in FIG. 17, since only the red gloves item and the blue gloves item is in the award set, the target count is equal to the sum of n_unadjusted (2) for the red glove item and the n_unadjusted for the blue glove item (2), divided by the award_max value (1), for a total target count of 4.

Figure 10A:
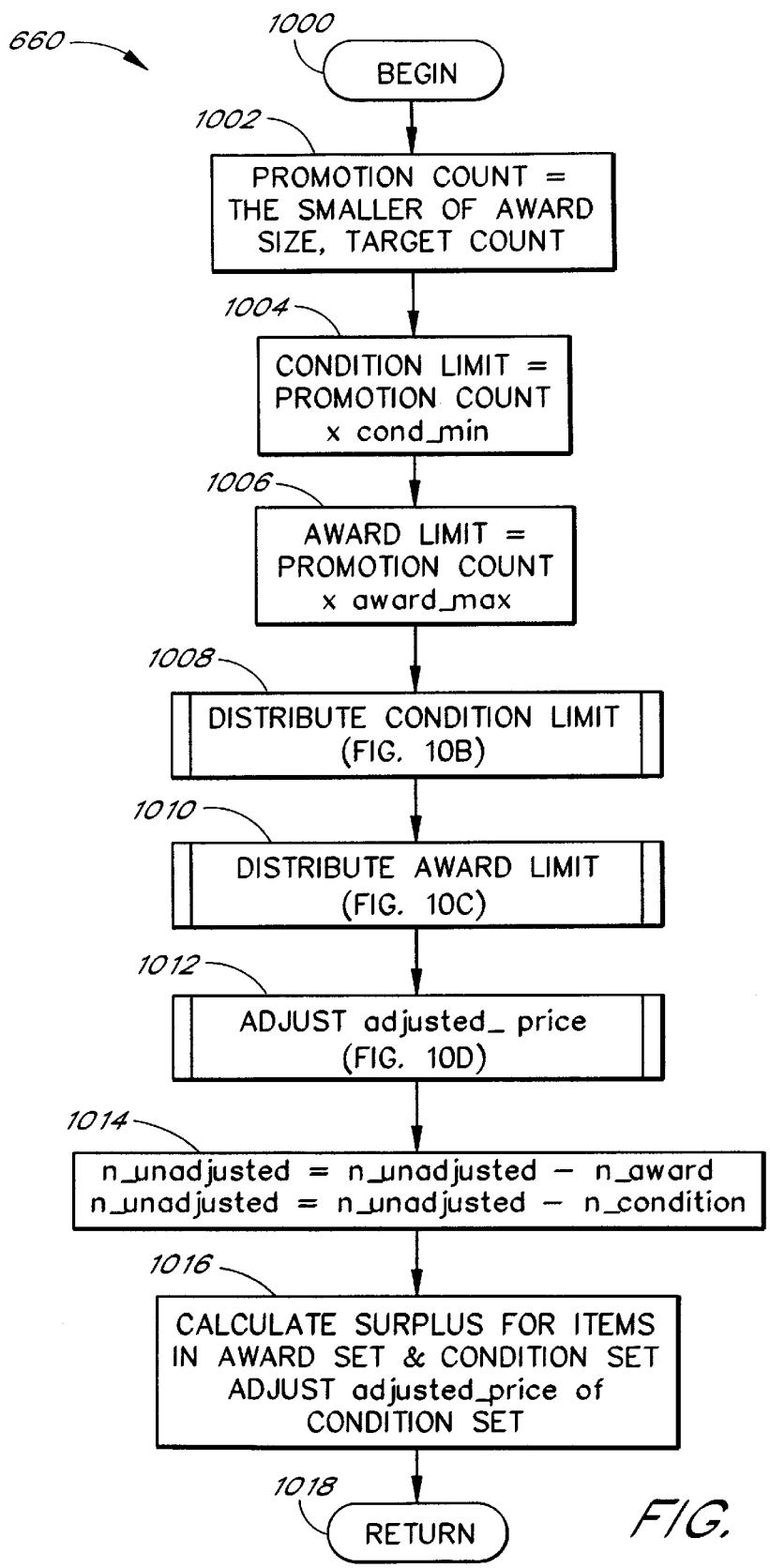
FIG. 10A illustrates a detailed flow chart of one embodiment of the application of the award.

Referring to FIG. 6, once the award size has been calculated and the award set determined, the preferred embodiment proceeds to state 660 where the promotion award is applied to the order. Referring to FIG. 10A, a detailed flow chart further illustrates the award application process of state 660.

As represented in the sample order illustrated in FIG. 17, each order item blackboard 1720, 1730, 1740 has a corresponding key-value pair n_unadjusted associated with it. The key-value n_unadjusted represents the quantity of the corresponding item which has not yet been used in triggering an award or in receiving an award. An n_unadjusted value of zero indicates that the entire quantity of the corresponding item has already been used in triggering an award or in receiving an award during the application of the current promotion or during the application of a higher ranked promotion. As, in the preferred embodiment an item may only be used once to trigger an applied award or to receive an award, an item with an n_unadjusted of zero may not be used to trigger or receive additional awards. Therefore, before the order is processed by the order pipeline 132, and thus before any awards have been applied, the key-value pair n__unadjusted is set to the value of the quantity key-value pair of the item ordered, indicating no award has yet been applied and that every item may be used to trigger or receive awards. Thus, the key-value pair n__unadjusted for the hat item is set equal to 7, the key-value pair n-unadjusted for the red glove item is set equal to 2, and the key-value pair n__unadjusted for the blue glove item is set equal to 2. Thereafter, during the process of applying promotions, the value n__unadjusted is varied appropriately to represent the unused quantity or value of the corresponding item which may be eligible to trigger lower ranked promotions or to receive awards, as described below.

Each order item also has a corresponding key-value pair adjusted__price associated with it. As discussed above, the key-value pair adjusted__price is initialized to $0 for each item before the order is processed by the order pipeline 132. The key-value pair adjusted__price represents the total price for the quantity of a corresponding item which has had an award applied to it plus the total price for the quantity of the corresponding item for which there is no award available to be applied. Thus, the key-value pair adjusted__price is set to $0 before the order is processed by the order pipeline 132, as no award has yet been applied and thus no item price has been adjusted.

Table VI illustrates a subset of the key-value pairs associated with each item blackboard 1720, 1730, 1740 from the example order illustrated in FIG. 17. The order illustrated in FIG. 17 includes seven hats with a current price of $9 (after the sale price has been applied in stage 328), two pairs of red gloves with a current price of $5, and two pairs of blue gloves with a current price $6. Each item has had their corresponding key-value pairs, n__unadjusted, adjusted__price, initialized as described above. Therefore, n__unadjusted of each item is set equal to the corresponding item quantity, and adjusted__price of each item is set to $0. Furthermore each item has its current price and the quantity ordered, entered. Tables VI–IX illustrate an example of the application of the hat promotion to the order illustrated in FIG. 17 in accordance with the preferred embodiment of the present invention, as described below. The hat promotion illustrated in Table V is "buy two hats and get a pair of gloves at half the current price".

value is set to 2 in the cond__min entry of the hat promotion illustrated in Table V.

Using Equation 4, the award size is calculated as follows:

$$\text{Award Size} = \text{The integer value of } (7/2)$$

The above calculation results in an award size equal to 3. Therefore, the shopper is entitled to three half-price pairs of gloves.

Proceeding to state 1002, a promotion count is determined. The promotion count represents the number of awards that will be applied to the order by the promotion being considered. In the preferred embodiment, the promotion count is equal to the lesser of the award size or the target count. If the award size and target count have the same value, then the product count is set to that value. Thus, in the preferred embodiment, the award being applied to an order may not exceed the value of the target count, representing the quantity of items which have not yet received an award or been used to trigger an award, divided by the award__max entry. Similarly, in the preferred embodiment, an order may not receive an award greater than the award size, representing the quantity of unapplied awards. Considering again the application of the hat promotion illustrated in Table V to the sample order illustrated in FIG. 17, the previously calculated award size for the order is 3, and the previously calculated target count is 4. Since the award size is smaller than the target count, the promotion count is set equal to the award size of 3.

Proceeding to state 1004 a condition limit is calculated. The condition limit represents the maximum possible adjustment to the n__unadjusted values of the condition set items by the promotion under consideration. Thus, the condition limit represents the maximum possible number of condition set items which were used to earn awards which will be actually applied to award set items, as discussed below.

The condition limit is equal to the promotion count multiplied by the cond__min value. Considering again the application of the hat promotion illustrated in Table V to the sample order illustrated in FIG. 17, the previously calculated promotion count for the order is 3, and the cond__min value, from Table V, is 2. Thus, using the equation illustrated in state 1004, the condition limit is:

TABLE VI

| Item # | Item | current__price | quantity | n__unadjusted | adjusted__price |
|---|---|---|---|---|---|
| 1 | Hats | $9.00 | 7 | 7 | $0.00 |
| 2 | Red Gloves | $5.00 | 2 | 2 | $0.00 |
| 3 | Blue Gloves | $6.00 | 2 | 2 | $0.00 |

As discussed above, the condition set for the present example includes only Item 1, the hats, as only the hats meet the condition criteria specified in the hat promotion. As illustrated above, the award set includes Item 2 and Item 3, the red gloves and the blue gloves respectively, as only the red and blue gloves meet the award set criteria specified in the hat promotion. Since the condition basis type for this promotion is quantity ("buy two hats and get a pair of gloves. . ."), the condition basis "Condition Basis Value" is, as discussed above, equal to the n__unadjusted value of the hat item, 7.

As previously described, the condition value is the minimum amount needed to qualify for an award. The condition $$\text{Condition Limit} = 2 \times 3$$

Thus, the condition limit is 6 in this example.

Proceeding to state 1006, an award limit is calculated. The award limit represents the maximum possible adjustment to the n__unadjusted values of the award set items by the promotion under consideration. Thus, the award limit represents the maximum possible number of award set items which actually may have awards applied to them by the promotion under consideration, as discussed below.

The award limit is equal to the promotion count multiplied by the award__max value. Considering again the application of the hat promotion illustrated in Table V to the sample order illustrated in FIG. 17, the previously calculated promotion count for the order is 3, and the award_max value, from Table V, is 1. Thus, using the equation illustrated in state 1006, the award limit is:

Award Limit=3×1

Thus, the award limit is 3 in this example.

Proceeding to state 1008, the condition limit count is distributed over the condition set item, thereby determining which condition set items will have their n_unadjusted value adjusted, as explained below.

Figure 10B:
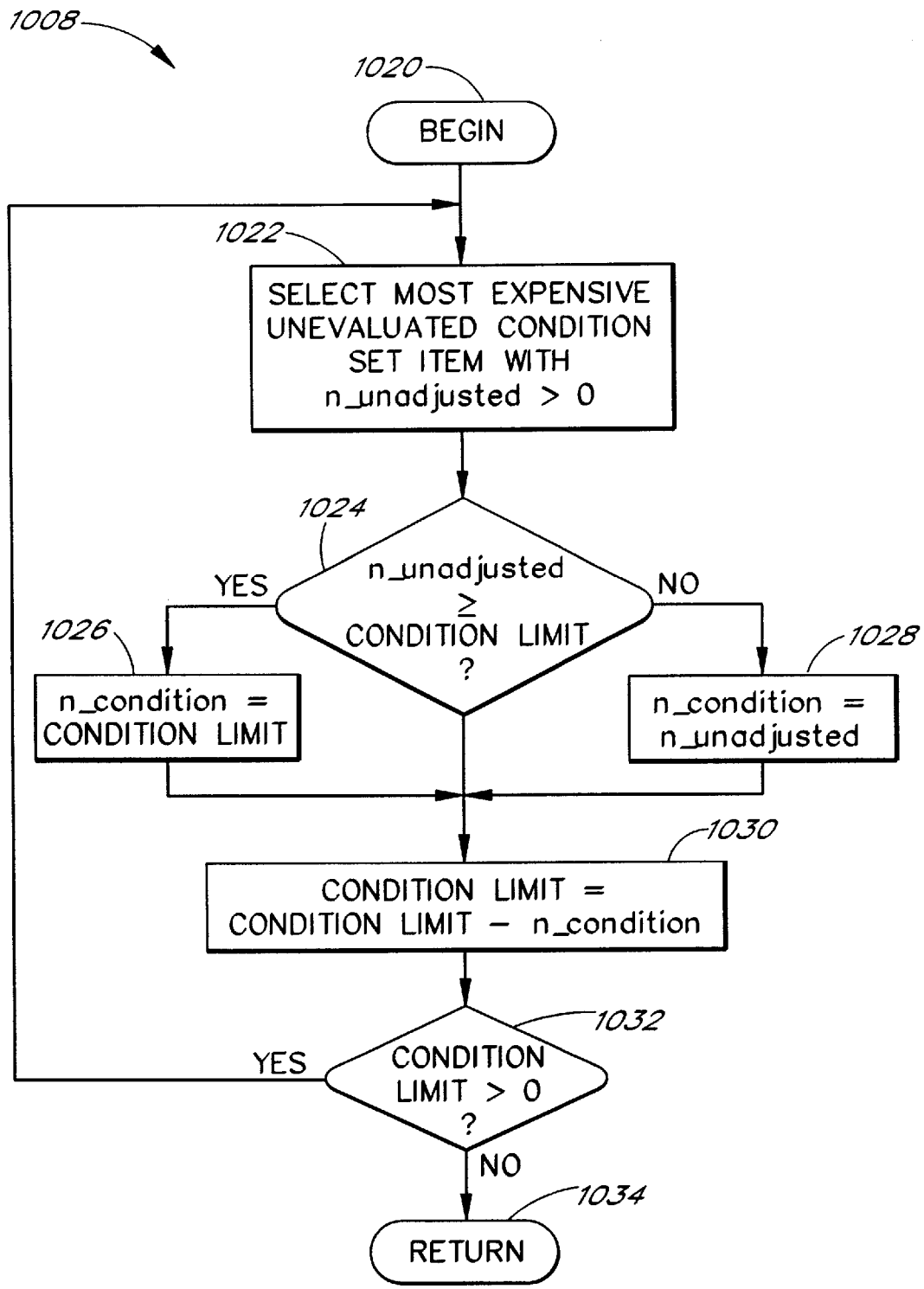
FIG. 10B illustrates a detailed flow chart of one embodiment of the condition limit distribution.

Referring to FIG. 10B, a detailed flow chart further illustrates the condition limit count distribution process of state 1008. Beginning in state 1020, the preferred embodiment proceeds to state 1022. In the preferred embodiment, the most expensive unevaluated condition set item with an n_unadjusted value greater than zero is selected. Proceeding to state 1024, a determination is made as to whether the value of n_unadjusted for the selected item is greater than the condition limit. If the value of n_unadjusted is greater than the condition limit, the preferred embodiment proceeds to state 1026. In state 1026, a variable n_condition is set equal to the condition limit. The variable n_condition represents the amount of the selected condition set item which will be "used-up," or exhausted, when an award is applied to an award set item. Thus, if an item is not in the condition set, it will have an n_condition value of zero.

If the value of n_unadjusted is less than the condition limit, the preferred embodiment proceeds from state 1024 to state 1028. In state 1028, the variable n_condition is set equal to the value of n_unadjusted for the selected item. Thus, in the preferred embodiment, the amount of the condition limit count being applied to a condition set item may not exceed the value of n_unadjusted for the item, representing the quantity of the item which not yet received an award or been used to trigger an award. In the preferred embodiment the value of n_condition is located in the same data structure as the order in the format of a key-value pair.

In the preferred embodiment, the most expensive condition set item is selected in state 1022 to ensure the most expensive item is used to earn the award, rather than have the award applied to the most expensive item first. In another embodiment, the least expensive item may be selected first in state 1022, ensuring that the least expensive item is first used to earn the award.

Proceeding to state 1030, the value of the condition limit count is decreased by the amount of the condition limit count applied to the selected item. Thus, the condition limit is reduced by the value of n_condition. Proceeding to state 1032, if the condition limit count is still greater than zero, then the preferred embodiment proceeds to state 1022, where the process is repeated until the condition limit has been completely applied to the order.

Considering again the application of the hat promotion illustrated in Table V to the sample order illustrated in FIG. 17, the previously calculated condition limit for the order is 6. The value of n_unadjusted for the hat, the only item in the condition set, is 7. Since n_unadjusted for the hat is greater than the condition limit count, the value of n_condition is set equal to the condition limit count, 6. Referring to sate 1030, the new condition limit count is equal to the value of n_condition, 6, subtracted from the previous condition limit count, 6, which is equal to zero. Thus, the condition limit count has been totally applied to the hat item.

Referring to FIG. 10A, the preferred embodiment proceeds to state 1010. In state 1010 the award limit count is distributed over the award set item, thereby determining which award set items will have their n_unadjusted value adjusted, as explained below.

Figure 10C:
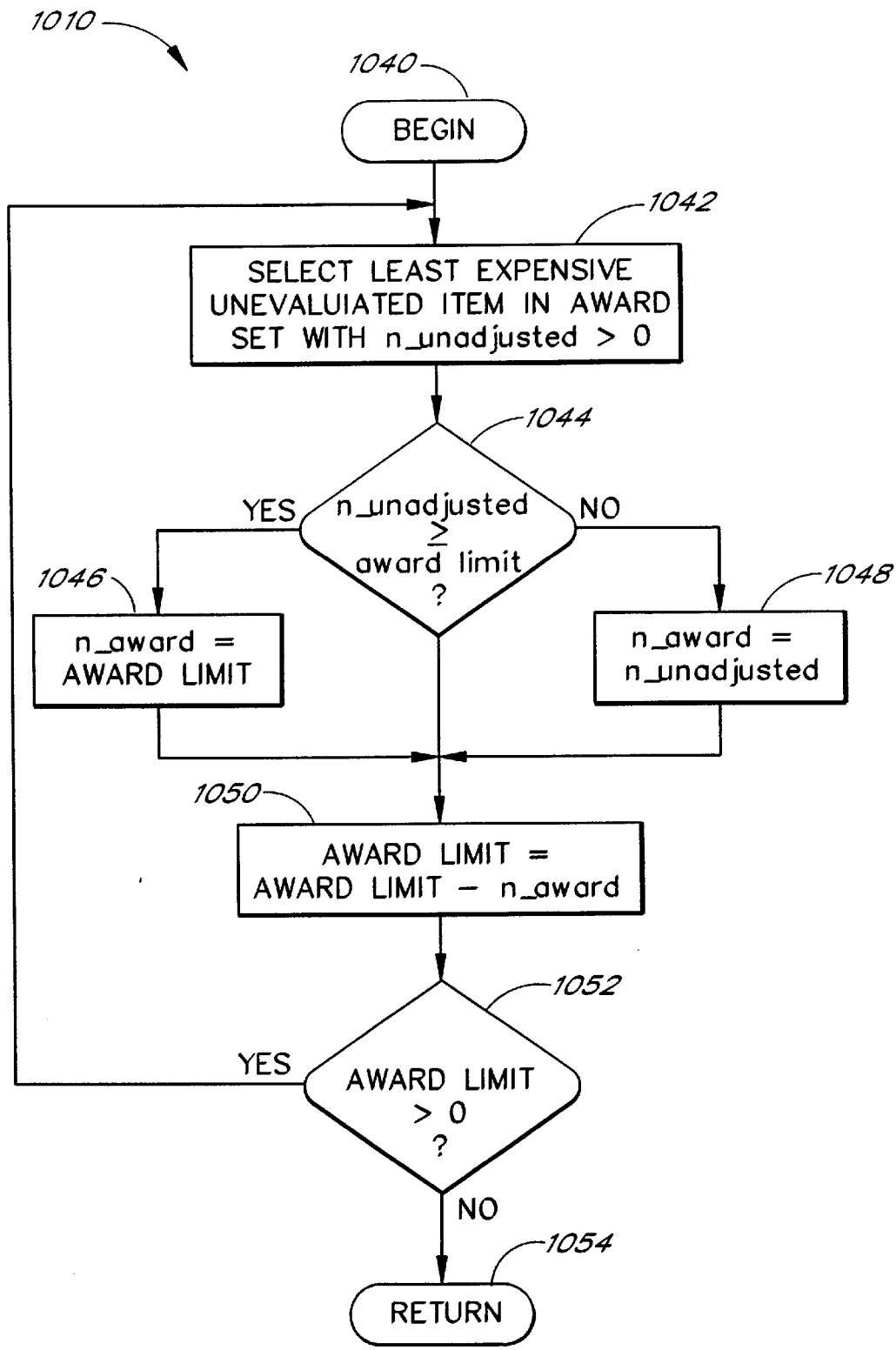
FIG. 10C illustrates a detailed flow chart of one embodiment of the award limit distribution.

Referring to FIG. 10C, a detailed flow chart further illustrates the award limit count distribution process of state 1010. Beginning in state 1040, the preferred embodiment proceeds to state 1042. In the preferred embodiment, the least expensive unevaluated condition set item with an n_unadjusted value greater than zero is selected. Proceeding to state 1044, a determination is made as to whether the value of n_unadjusted for the selected item is greater than the award limit. If the value of n_unadjusted is greater than the award limit, the preferred embodiment proceeds to state 1046. In state 1046, a variable n_award is set equal to the award limit. The variable n_award represents the amount of the selected award set item which will be have an award applied to it. Thus, if an item is not in the award set, it will have an n_award value of zero. If the value of n_unadjusted is less than the award limit, the preferred embodiment proceeds from state 1044 to state 1048. In state 1048, the variable n_award is set equal to the value of n_unadjusted for the selected item. Thus, in the preferred embodiment, the amount of the award limit count being applied to an award set item may not exceed the value of n_unadjusted for the item, representing the quantity of the item which not yet received an award or been used to trigger an award. In the preferred embodiment the value of n_award is located in the same data structure as the order in the format of a key-value pair.

In the preferred embodiment, the least expensive award set item is selected in state 1042 to ensure the award is applied first to the least expensive item. In another embodiment, the most expensive item may be selected first in state 1042, ensuring that the most expensive item is first as an award target.

Proceeding to state 1050, the value of the award limit count is decreased by the amount of the award limit count applied to the selected item. Thus, the award limit is reduced by the value of n_award. Proceeding to state 1052, if the award limit count is still greater than zero, then the preferred embodiment proceeds to state 1042, where the process is repeated until the award count limit has been completely applied to the order. Once the award count limit is equal to zero the preferred embodiment proceeds to state 1054.

Considering again the application of the hat promotion illustrated in Table V to the sample order illustrated in Table VI, the previously calculated award limit for the order is 3. The red gloves item, the least expensive item in the award set, will be selected first to be an award target. The value of n_unadjusted for the red gloves item is 2. Since n_unadjusted for the red gloves item is less than the award limit count, the value of n_award is set equal to the value of n_unadjusted for the red gloves item, 2. Referring to sate 1050, the new award limit count is equal to the value of n_award, 2, subtracted from the previous award limit count, 3, which is equal to 1. Thus, the award limit still has a count of 1 remaining, which will be applied to the blue gloves item.

The value of n_unadjusted for the blue gloves item is 2. Since n_unadjusted for the blue gloves item is greater than the award limit count, the value of n_award is set equal to the award limit count, 1. Referring to state 1050, the new award limit count is equal to the value of n_award, 1, subtracted from the previous award limit count, 1, which is equal to 0. Thus, the award has been totally used-up, and there is no remaining award to be applied.

Table VII, below illustrates the sample order in FIG. 17 and in Table VI above, with the value of n_award and n_condition for each item entered, in accordance with the above description.

TABLE VII

| Item # | Item | current_price | quantity | n_unadjusted | adjusted_price | n_condition | n_award |
|---|---|---|---|---|---|---|---|
| 1 | Hats | $9.00 | 7 | 7 | $0.00 | 6 | 0 |
| 2 | Red Gloves | $5.00 | 2 | 2 | $0.00 | 0 | 2 |
| 3 | Blue Gloves | $6.00 | 2 | 2 | $0.00 | 0 | 1 |

Figure 10D:
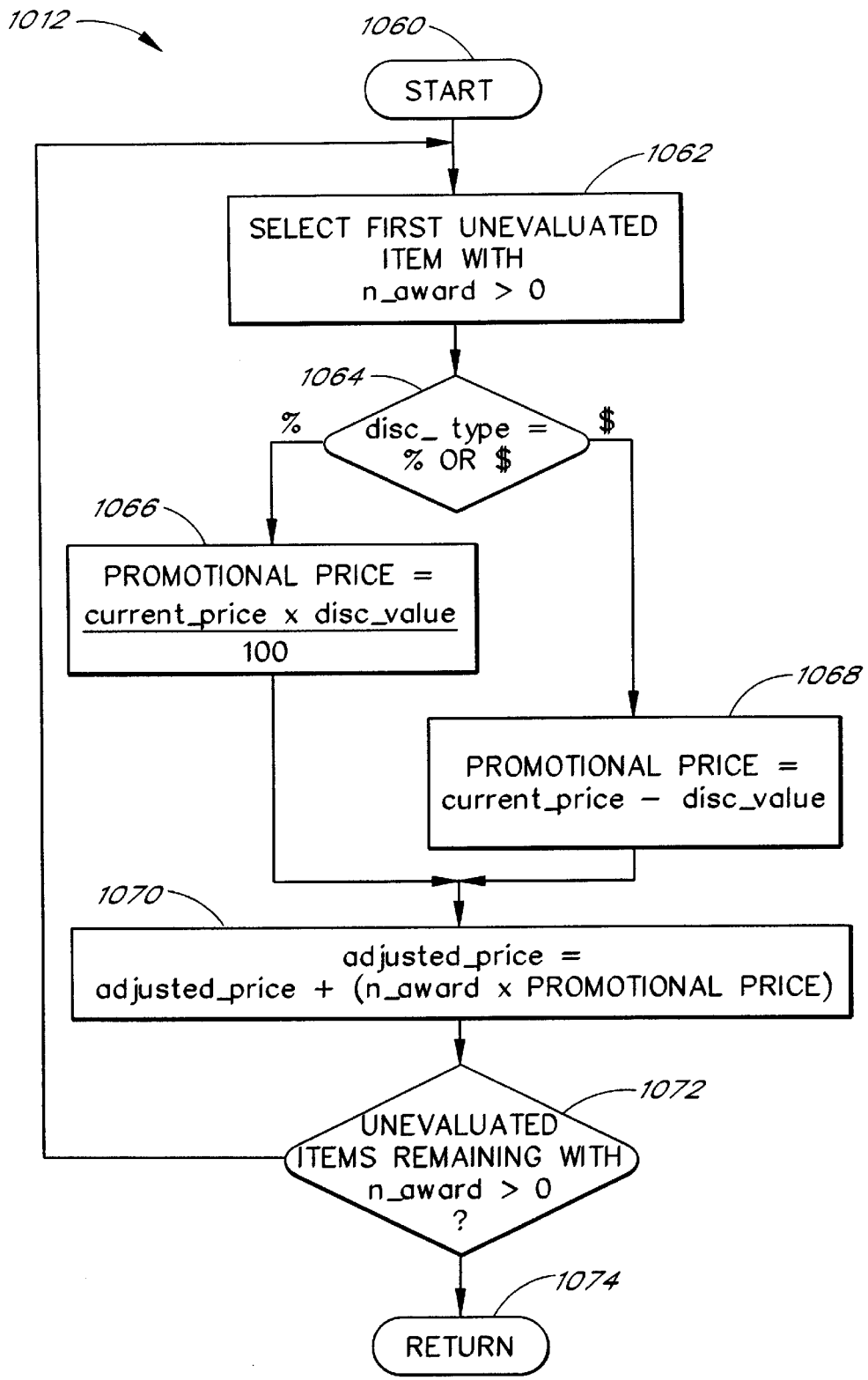
FIG. 10D illustrates a detailed flow chart of one embodiment of the adjusted price calculation.

Referring to FIG. 10A, the preferred embodiment proceeds to state 1012. The adjust_price value of each item is now calculated. Referring to FIG. 10D, a detailed flow chart further illustrates the process of determining the adjust_price value for each item. Beginning in state 1060, the preferred embodiment proceeds to state 1062. In the preferred embodiment the first item on the order with an n_award value greater than zero, indicating it is entitled to an award, is selected.

The preferred embodiment proceeds from state 1062 to state 1064 which determines the award discount type using the disc_type entry from the promotion table. The discount type may either be a percentage off the current item price or a flat dollar amount off the current item price. Using the hat promotion illustrated in Table V as an example, the disc_type entry is a "%", indicating that the discount type is a percentage of the current price of the item.

If the discount type is a percentage, the preferred embodiment proceeds to state 1066 which calculates a promotional price for the item. The promotional price of the item is calculated by multiplying the current price by the disc_value, and dividing the result by one hundred. If instead, the disc_type entry is a "$", then the preferred embodiment proceeds from state 1064 to state 1068. The promotional price of the item is calculated by subtracting the disc_value from the current_price.

Proceeding to state 1070, the adjusted_price is calculated by multiplying the promotional price by the value of n_award and adding the old adjusted_price.

Proceeding to state 1072, if there are unevaluated items remaining with a n_award value greater than zero, the preferred embodiment loops back to state 1062. Otherwise, the preferred embodiment proceeds to state 1074.

Considering again the application of the hat promotion illustrated in Table V to the sample order illustrated in Table VII, the discount value disc_value from the hat promotion table is equal to 50. The old adjusted_price of $0, and the current_price of $5 are retrieved from the order, illustrated in Table VII. As previously calculated, the value of n_award for the red gloves item is 2.

The promotional price of the red gloves item is calculated using the equation of step 1066, with the current_price=$5, and the disc_value=50, as follows:

$$\text{Promotional Price} = (\$5 \times 50)/100$$

Thus, the promotional price for the red gloves item is $2.50.

The adjusted_price of the red gloves item is calculated using the equation of step 1070, with the old adjusted_price=$0, n_award=2, and the promotional price=$2.50, as follows:

$$\text{adjusted\_price} = \$0 + (2 \times \$2.50)$$

Thus, the new adjusted_price value for the red gloves items is $5.00.

The promotional price of the blue gloves item is calculated using the equation of step 1066, with the current_price=$6, and the disc-value=50, as follows:

$$\text{Promotional Price} = (\$6 \times 50)/100$$

Thus, the promotional price for the blue gloves item is $3.00.

The adjusted_price of the blue gloves item is calculated using the equation of step 1070, with the old adjusted_price=$0, n_award=1, and the promotional price=$3.00, as follows:

$$\text{adjusted\_price} = \$0 + (1 \times \$3.00)$$

Thus, the new adjusted_price value for the blue gloves items is $6.00.

Referring to FIG. 10A, the preferred embodiment proceeds to state 1014. The value of n_unadjusted is adjusted for each item on the order to reflect the quantity of the item which was used to earn applied awards and the quantity of the item which received awards. Thus, in the preferred embodiment, first the value of n_award of each item is subtracted from the corresponding value of n_unadjusted. Then the value of n_condition of each item is subtracted from the corresponding value of n_unadjusted.

Considering again the application of the hat promotion illustrated in Table V to the sample order illustrated in Table VII, the n_unadjusted of each of the items are calculated using the equations of state 1014, as follows:

1) hat item's n_unadjusted=7 (the old n-unadjusted)−0 (n_award value)−6(n_condition value)
2) red gloves item's n-unadjusted=2 (the old n_unadjusted)−2 (n_award value)−0 (n_condition value)
3) blue gloves item's n_unadjusted=2 (the old n_unadjusted)−1 (n_award value)−0 (n_condition value)

Thus, n_unadjusted for the hat item is equal to 0, n_unadjusted for the red gloves item is equal to 0, and n_unadjusted for the blue gloves item is equal to 1.

Referring to FIG. 10A, the preferred embodiment proceeds to state 1016. State 1016 calculates the adjusted_price value of items with a n_condition value greater than zero. Furthermore, State 1016 address the situation where an item is in both the award set and the condition set. Hence, the item may have non-zero values for both n_condition and n_award. If n_condition is greater than n_award, than the adjusted_price value of the line item is calculated by Equation 6, as follows:

$$\text{adjusted\_price} = \text{adjusted\_price} + (\text{n\_condition} - \text{n\_award}) \times \text{current\_price} \quad (6)$$

Thus, if there is any "surplus" of n_condition as compared to n_award of the item, the value of the adjusted_price will be adjusted accordingly. In addition, the value of the surplus, (n_condition−n_award), is subtracted from the n_unadjusted value for the item. If an item only has a n_condition value greater than zero, Equation 6 reduces to Equation 7, as follows:

$$\text{adjusted\_price} = \text{adjusted\_price} + (\text{n\_condition} \times \text{current\_price}) \quad (7)$$

Considering again the application of the hat promotion illustrated in Table V to the sample order illustrated in Table VII, the current_price for the hat item is $9.00. The old adjusted_price is $0, and the n_condition value is 6. The adjusted_price value for the hat item is as follows:

$$\text{adjusted\_price} = \$0 + (6 \times \$9)$$

Thus, the adjusted_price of the hat item is $54.

The above calculated adjusted_prices and n_adjusted values are illustrated in Table VIII below.

TABLE VIII

| Item # | Item | current_price | quantity | n_unadjusted | adjusted_price | n_condition | n_award |
|---|---|---|---|---|---|---|---|
| 1 | Hats | $9.00 | 7 | 1 | $54.00 | 6 | 0 |
| 2 | Red Gloves | $5.00 | 2 | 0 | $5.00 | 0 | 2 |
| 3 | Blue Gloves | $6.00 | 2 | 1 | $3.00 | 0 | 1 |

Thus, the hats item and the blue gloves item have an n_unadjusted value greater than 0. Therefore, only the hats item and the blue gloves item may trigger future promotions or be the target of future awards.

The preferred embodiment proceeds from state 1016 to state 1018.

Referring to FIG. 6, the preferred embodiment then proceeds to state 670. In the preferred embodiment, any items used to trigger a promotion for which awards were applied are removed from the consideration set. Similarly, any items which received awards are removed from the consideration set. Thus, any items with an n_unadjusted equal to zero will be removed from the consideration set. Those items removed from the consideration set are not eligible to trigger or receive additional awards. Thus, in the preferred embodiment of the order price adjust stage 332, an item may only trigger one promotion in the order price adjust stage 332 for which awards are granted, and an item may only receive one award. This advantageously permits a merchant to offer multiple promotions, while ensuring that those promotions will not result in unintended or excessive awards. The preferred embodiment proceeds from state 670 to state 680. In the above example, only Item 2 has an n_unadjusted equal to zero, and so only Item 2 is removed from the consideration set.

In an alternate embodiment, the merchant may permit an item to both trigger more than one award and receive more than one award. This is accomplished by leaving an item in the consideration set, even though the item has already triggered a promotion for which awards were granted or received an award. Thus, for example, an item, such as a jazz CD, may be eligible for a promotion for "10% off all CDs in the store" and a promotion for "take an additional 5% off every jazz CD." In this example, a shopper purchasing a jazz CD would first receive a 10% discount, and would then receive an additional 5% discount off the list price.

Referring to FIG. 4, if the consideration set is empty, or if there are no more promotions, the preferred embodiment proceeds to state 462, where the total price for each ordered items is calculated. The key-value pair adjusted_price for all items having an n_unadjusted key-value pair with a value greater than zero is adjusted. The adjusted_price key-value pair will be calculated using the current price of all items with an n_unadjusted value greater than zero. Thus, in the current example, illustrated in Table VIII, the adjusted_price key-value pair of Item 1, the hats item, is calculated by multiplying the n_unadjusted value (1) by the current_price value ($9.00) and adding the result ($9.00) to the current adjusted_price ($54.00). The result of this calculation is $63.00, as illustrated in Table IX below. Furthermore, the n_adjusted key-value pair of Item 1 is also set to zero. Additionally, the adjusted_price key-value pair of Item 3, the blue gloves item, is calculated by multiplying the n_unadjusted value (1) by the current_price value ($6.00) and adding the result ($6.00) to the current adjusted_price ($3.00). The result of this calculation is $9.00, as illustrated in Table IX below. Furthermore, the n_adjusted key-value pair of Item 3 is also set to zero.

TABLE IX

| Item # | Item | current_price | quantity | n_unadjusted | adjusted_price |
|---|---|---|---|---|---|
| 1 | Hats | $9.00 | 7 | 0 | $63.00 |
| 2 | Red Gloves | $5.00 | 2 | 0 | $5.00 |
| 3 | Blue Gloves | $6.00 | 2 | 0 | $9.00 |

The preferred embodiment proceeds from state 462 to state 470, whereupon the next pipeline stage, the shipping stage 336, processes the order.

V. HTML Promotion Rules Form For Use in Defining The Promotions

Figure 12A:
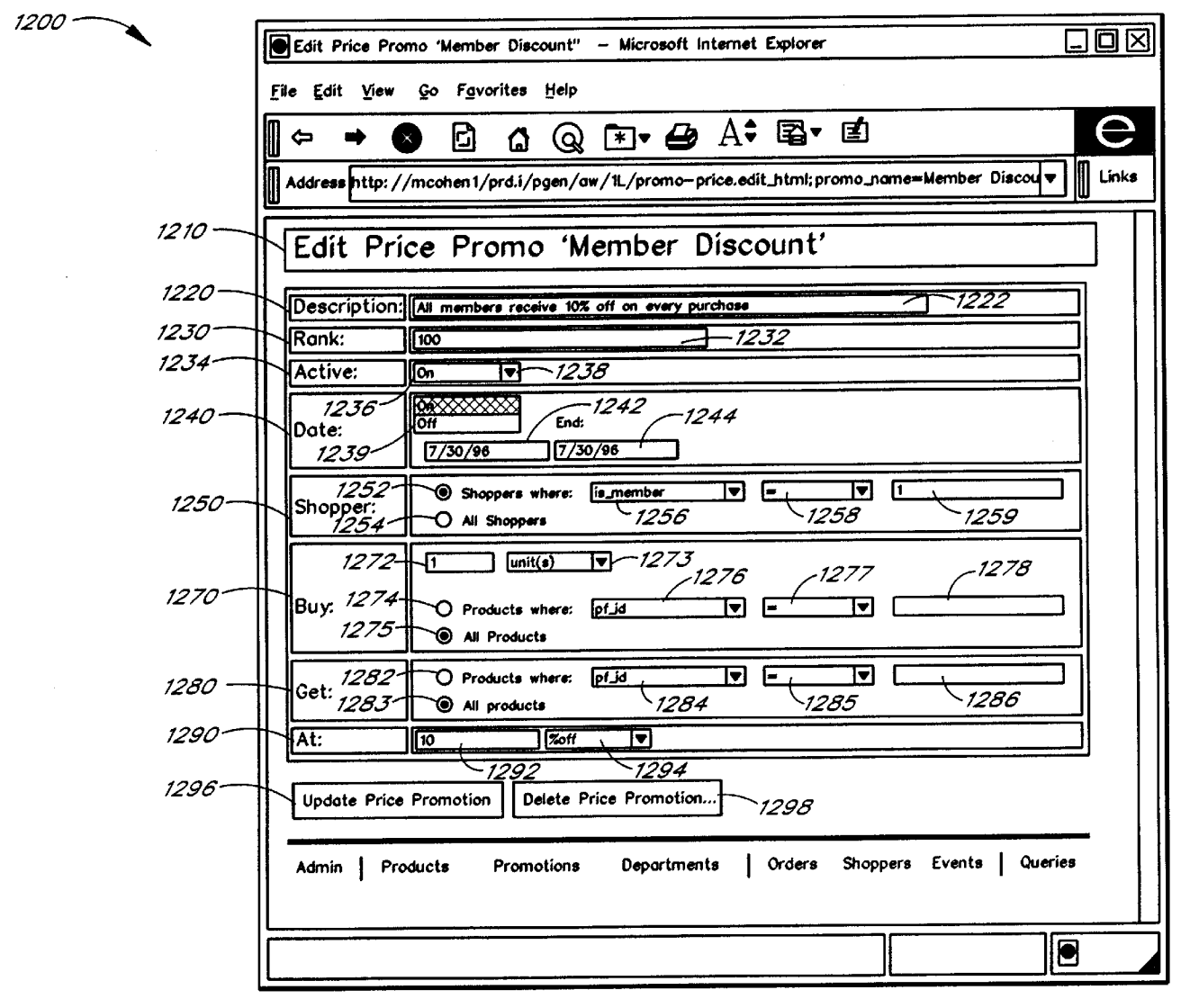

The schema of the preferred embodiment promotion table, described in Table IV above, provides a merchant with a powerful format for describing the rules of multiple promotions. In the preferred embodiment, the promotion rules for each promotion may be entered directly by the merchant into a promotion creation administrative form. Furthermore, the promotion rules for each promotion may be modified by the merchant using a promotion edit administrative form. A preferred embodiment of a promotion edit administrative form 1200 for a corresponding promotion is illustrated in FIG. 12A. The promotion form 1200 includes multiple fields through which the merchant defines the promotion rules. Each entry field corresponds to a promotion table field. Thus, the information entered by the merchant is used to automatically generate a corresponding promotion table. Using the promotion form 1200, a merchant can expediently define the rules for each promotion, without the need of a programmer and without generating new code.

In the preferred embodiment, the administrative promotion form 1200 is an HTML documents which contain HTML encoding. Using HTML to generate the administrative form 1200 advantageously allows the merchant to access the form 1200 either locally, at the merchant server site 30, or remotely, over the Internet 24.

HTML encoding is a script encoding language which is used to define document content information. As is well known in the art, HTML is a set of conventions for marking portions of a document so that, when accessed by a browser, each portion appears with a distinctive format. The HTML indicates, or "tags," portions of the document (e.g., the title, header, body text, etc.).

In the preferred embodiment, the promotion form 1200 contains a title block 1210, which informs the merchant the type of administrative form in use and the promotion being edited. Thus, in the example illustrated in FIG. 12A, the title block 120 informs that merchant that he is editing a price promotion entitled "Member Discount". The promotion title is retrieved from the promotion table, where it is stored in the promo_name column.

In the preferred embodiment, the promotion form 1200 contains a "Description" field 1220. The merchant may enter a description of the promotion, such as "All members receive 10% off on every purchase". This description may be used as advertising by the store. Furthermore, the present invention allows promotional advertising to be selectively presented to the consumer. For example, if the shopper requests information on a store item before the shopper indicates he wishes to purchase the item, the store process can retrieve the promotion table, search on the product sku, and if there is an active promotion for the item, read the information entered by the merchant into the "Description" 1220 and stored in the promotion table. The order adjust stage then evaluates the shopper and product information and appropriately present the shopper with the advertising copy entered by the merchant. Thus, in a preferred embodiment, promotional advertising will be presented to the consumer only if the consumer and the consumer's order is eligible for the promotion. For example, if the promotion is directed only to store members, and entitles members who purchase a hat to purchase an umbrella at half price, then the promotional advertisement, "With the purchase of every hat, get an umbrella at half-price" will, in one embodiment, only be presented to store members placing an order for a hat. Furthermore, all information relating to the promotion, including advertising copy, is advantageously stored in one table, greatly facilitating maintenance of the store promotions.

The promotion form 1200 further includes a rank field, where the merchant may enter the promotion rank.

The preferred embodiment of the promotion administrative form 1200 additionally includes an "Active" field 1234. The "Active" field is either "On" or "Off". The merchant activates a drop_down button 1238 with a mouse device, causing an "Active" drop-down menu 1239 to appear. The merchant appropriately selects either an "On" or "Off" entry. The form 1200 further includes a promotion term date field 1240, which has a promotion start date field 1242 and a promotion end date field 1244, where the merchant entries define the term of the promotion.

The merchant defines shopper eligibility for the promotion in a "Shopper" field 1250. The merchant may click on an "All Shoppers" field 1254, indicating all shoppers are eligible for the promotion. Alternatively, the merchant can click on an "Shoppers where:" field 1252, indicating the merchant will define shopper eligibility using a shopper_column field 1256, a shopper_op field 1258, and a shopper_value field 1259. The fields 1256, 1258 have corresponding drop-down menus. The shopper_column field 1256 has a drop-down menu permitting the merchant to select any field in the shopper record as the promotion trigger. In the preferred embodiment, the shopper_op field 1258 has a drop-down menu permitting the merchant to select any of the following operators: <, <=, =. >=, >.

The merchant defines what products may trigger the promotion in a "Buy" field 1270. The merchant may click on an "All Products" field 1275, indicating all products can trigger the promotion. Alternatively, the merchant can click on a "Products where:" field 1274, indicating the merchant will define the rules for triggering the promotion using a cond_column field 1276, a cond_op field 1277, and a cond_value field 1278. The fields 1276, 1277 have corresponding drop-down menus. The cond_column field 1276 has a drop-down menu permitting the merchant to select any field in the product record as the promotion trigger. The cond_op field 1277 has a drop-down menu permitting the merchant to select any of the following operators: <, <=, =. >=, >. Furthermore, the merchant can use a cond_basis field 1273 and associated drop down menu to define whether the condition basis is price or quantity. Additionally, the merchant can enter the corresponding price or quantity required to trigger the promotion in a cond_min field 1272.

The merchant defines what products are eligible to receive an award in a "Get" field 1280. The merchant may click on an "All Products" field 1283, indicating all products are eligible to receive an award. Alternatively, the merchant can click on a "Products where:" field 1282, indicating the merchant will define the rules for award eligibility using an award_column field 1284, an award_op field 1285, and an award_value field 1286. The fields 1284, 1285 have corresponding drop-down menus. The award_column field 1284 has a drop-down menu permitting the merchant to select any field in the product record. The award_op field 1285 has a drop-down menu permitting the merchant to select any of the following operators: <, <=, =. >=, >.

The merchant defines the award in an "At" field 1290. A disc_type field 1294 has a drop down menu permitting the merchant to specify if the award is a fixed dollar amount off or a percentage off. A disc_value field 1292 permits the merchant to enter the amount of the discount, either as a dollar amount off or as a percentage off.

Once the merchant has completed entering the promotion rules into the promotion table 1200, activation of the "Update Price Promotion" button 1296 causes the merchant server 30 to read the form entries and update the promotion table.

When editing an existing promotion, that promotion is identified by the URL. The merchant may change the values of any of the entries described above. Alternatively, the merchant may delete an existing promotion by activating the "Delete Price Promotion" button 1298. The server 30 responds by deleting the promotion from the promotion table.

Figure 12B:
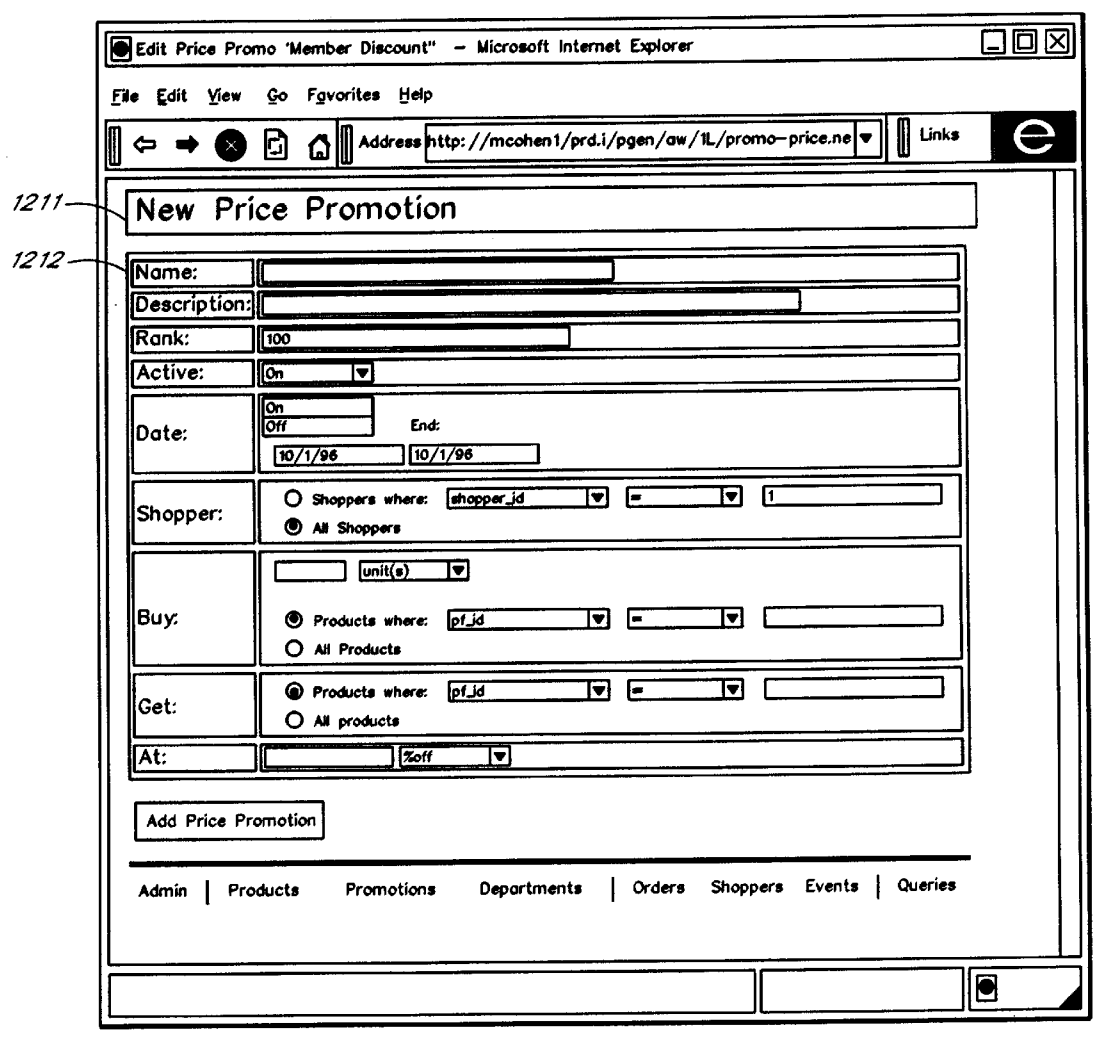

The promotion creation administrative form illustrated in FIG. 12B is similar to the promotion edit administrative form 1200. However, the promotion creation administrative form includes an additional name field 1212 for entering the promotion name and a title block 1211 indicating that the form is for creating a new price promotion.

In the preferred embodiment, the award_max column entries are all set to a "1", thereby simplifying the merchant's task in specifying the promotions. In an alterative embodiment, both the promotion edit form 1200 and the promotion creation form include an award_max field, where the merchant may enter the maximum allowable award.

VI. Conclusion

While certain preferred embodiments of the invention have been described, these embodiments have been presented by way of example only, and are not intended to limit the scope of the present invention. For example, although described herein with reference to the Internet, the promotion system and methodology can be used in other types of interactive communication systems. Accordingly, the breadth and scope of the present invention should be defined only in accordance with the following claims and their equivalents.

What is claimed is:

1. A method of applying a plurality of promotions to an order received over a communications network, comprising the steps of:
    providing a plurality of promotions, including instructions for applying said promotions, in a merchandising computer system;
    receiving an order from a consumer computer over the network;
    applying a first of said plurality of promotions to said order; and
    applying a second of said plurality of promotions to said order, sorting said plurality of promotions based on a rank of each of said promotions, such that a higher ranked promotion is applied to said order before a power ranked promotion.

2. The method of claim 1, further comprising the step of determining if said consumer is eligible for at least one of said plurality of promotions.

3. The method of claim 1, further comprising the step of determining if at least one of said plurality of promotions is active.

4. The method of claim 1, further comprising the step of determining if at least one of said plurality of promotions is between a corresponding promotion start date and a corresponding promotion end date.

5. The method of claim 1, further comprising the step of ensuring that said at least one item receives only one award from said plurality of promotions.

6. The method of claim 1, further comprising the step of ensuring that said at least one item triggers no more than one of said plurality of promotions.

7. The method of claim 1, further comprising the step of entering rules defining at least one of said plurality of promotions into a hypertext markup language page.

8. The method of claim 1, further comprising the step of creating a promotion table defining at least two of said plurality of promotions.

9. The method of claim 1, further comprising the step of calculating a quantity of said at least one item which did not receive an award from said plurality of promotions such that said quantity of said at least one item is eligible to receive additional awards.

10. A method of applying a plurality of promotions and granting awards to an order received over a communications network from a shopper, said order having at least one item having a price, said method comprising the steps of:
    providing a first memory location for promotion information;
    storing promotion information in said first memory location;
    providing a second memory location for shopper information;
    storing shopper information in said second memory location;
    using said shopper information to determine shopper eligibility for at least one of said plurality of promotions;
    providing a third memory location for product information;
    storing product information in said third memory location;
    providing a fourth memory location for an award set;
    storing said award set in said fourth memory location;
    providing a fifth memory location for a condition set;
    storing said condition set in said fifth memory location; and
    using said promotion information, said product information, said award set, and said condition set to adjust said price of said at least one item;
    sorting said plurality of promotions according to a promotion ranking, such that said highest ranked promotion is applied first to said order.

11. The method of claim 10, further comprising the step of removing said at least one item from further promotional consideration.

12. The method of claim 10, further comprising the step of calculating a size of said award.

13. A method of applying a plurality of promotions to an electronic order, said method comprising the steps of:
    providing a merchant computer;
    providing a connection between said merchant computer and a shopper computer;
    transmitting an order having at least one item from said shopper computer to said merchant computer;
    determining if said at least one item is eligible to receive an award from at least one of said plurality of promotions using a promotion component executing in said merchant computer;
    applying said award to at least a portion of said at least one item;
    recording that said portion of said at least one item received said award;
    preventing said portion of said at least one item from receiving additional awards;
    determining if said at least one item is eligible to trigger at least one of said plurality of promotions;
    determining a size of said award; and
    decrementing said award size by an amount representing said portion of said award applied to said at least one item.

14. A promotion application system comprising:
    a trigger identifier module stored in a computer, said trigger identifier module including instructions configured to review a list of items on an order and to identify those items eligible to trigger a promotion;

a target identifier module stored in said computer, said target identifier module including instructions configured to review said list of items on said order and to identify those items eligible to be the target of said promotion; and a shopper module stored in said computer, said shopper module including instructions configured to identify those shoppers qualifying for said promotion.

15. A promotion application system as defined in claim 14, further comprising an award calculation module stored in said computer, said award calculation module including instructions configured to review said list of items and to calculate an award size.

16. A promotion application system as defined in claim 15, further comprising an award distribution module stored in said computer, said award distribution module including instructions configured to review said list of items and to identify a portion of said award size to be applied to each item on said list of items.

17. A promotion application system as defined in claim 15, further comprising a consideration module stored in said computer, said consideration module including instructions configured to identify which items on said list of items have received awards and which items on said list of items have triggered promotions.

18. A promotion application system comprising;

a trigger identifier module stored in a computer, said trigger identifier module including instructions configured to review a list of items on an order and to identify those items eligible to trigger a promotion;

a target identifier module stored in said computer, said target identifier module including instructions configured to review said list of items on said order and to identify those items eligible to be the target of said promotion; and a promotion module stored in said computer, said promotion module including instructions configured to review a plurality of promotions and to select at least one of said promotions based on a corresponding rank of said at least one of said promotions.

19. A promotion application system as defined in claim 18, wherein said promotion module includes instructions configured to identify if said at least one of said promotions is active.

\* \* \* \* \*